United States Patent
Puig Ruiz et al.

(10) Patent No.: US 12,498,960 B2
(45) Date of Patent: Dec. 16, 2025

(54) SYSTEMS AND METHODS OF DETERMINING DYNAMIC TIMERS USING MACHINE LEARNING

(71) Applicant: NASDAQ, INC., New York, NY (US)

(72) Inventors: Josep Puig Ruiz, Boston, MA (US); Douglas Hamilton, Boston, MA (US); Diana Kafkes, South Boston, MA (US); Andrew Rooks, Boston, MA (US); Eugenio Piazza, Stockholm (SE); Andrew Oppenheimer, Hoboken, NJ (US); Charles Mack, Madison, NJ (US); Michael O'Rourke, Southbury, CT (US); Nick Ciubotariu, Austin, TX (US); Edward Coughlin, Midland Park, NJ (US)

(73) Assignee: Nasdaq, Inc., New York, NY (US)

( * ) Notice: Subject to any disclaimer, the term of this patent is extended or adjusted under 35 U.S.C. 154(b) by 427 days.

(21) Appl. No.: 18/302,624

(22) Filed: Apr. 18, 2023

(65) Prior Publication Data
US 2024/0111568 A1    Apr. 4, 2024

Related U.S. Application Data

(60) Provisional application No. 63/377,325, filed on Sep. 27, 2022, provisional application No. 63/377,326, filed on Sep. 27, 2022, provisional application No. 63/377,317, filed on Sep. 27, 2022, provisional application No. 63/377,321, filed on Sep. 27, 2022.

(51) Int. Cl.
G06F 9/44      (2018.01)
G06F 5/06      (2006.01)
G06F 9/46      (2006.01)
G06N 3/045     (2023.01)
G06N 3/049     (2023.01)
G06N 3/084     (2023.01)
G06N 3/092     (2023.01)

(52) U.S. Cl.
CPC ............... *G06F 9/466* (2013.01); *G06F 5/06* (2013.01); *G06N 3/045* (2023.01); *G06N 3/049* (2013.01); *G06N 3/084* (2013.01); *G06N 3/092* (2023.01)

(58) Field of Classification Search
CPC ..................................................... G06F 9/466
USPC ........................................................ 718/101
See application file for complete search history.

(56) References Cited

U.S. PATENT DOCUMENTS 11,887,191 B2 *  1/2024  Inzirillo .................. G06F 7/582
2005/0008019 A1  1/2005  Berger et al.
2008/0253402 A1  10/2008  Prudden
(Continued)

OTHER PUBLICATIONS

International Search Report and Written Opinion of the ISA for Application No. PCT/US2023/075079, 15 pages, dated Jan. 3, 2024.

*Primary Examiner* — Timothy A Mudrick
(74) *Attorney, Agent, or Firm* — Nixon & Vanderhye P.C.

(57) ABSTRACT

Dynamic timers are determined using machine learning. The timers are used to control the amount of time that new data transaction requests wait before being processed by a data transaction processing system. The timers are adjusted based on changing conditions within the data transaction processing system. The dynamic timers may be determined using machine learning inference based on feature values calculated as a result of the changing conditions.

23 Claims, 13 Drawing Sheets

(56) References Cited

U.S. PATENT DOCUMENTS

| | | | | |
|---|---|---|---|---|
| 2014/0373122 A1* | 12/2014 | Varadarajan | .......... | G06F 21/316 726/7 |
| 2023/0115282 A1* | 4/2023 | Iley | ...................... | G06F 9/4881 718/104 |

* cited by examiner

SYSTEMS AND METHODS OF DETERMINING DYNAMIC TIMERS USING MACHINE LEARNING

CROSS REFERENCE(S) TO RELATED APPLICATION(S)

This application claims priority to U.S. Provisional Application Nos. 63/377,317; 63/377,321; 63/377,325; and 63/377,326, all filed on Sep. 27, 2022, the entire contents of each being incorporated by reference herein. This application is one of four related applications, all filed on even date herewith; this application incorporates the entire contents of each of the other three related applications. The related applications are U.S. patent application Ser. No. TBD; U.S. patent application Ser. No. TBD; and U.S. patent application Ser. No. TBD. U.S. Pat. Nos. 9,712,606; 10,585,729; and 11,503,108 are each entirely incorporated by reference herein. U.S. patent application Ser. No. 18/110,967 is entirely incorporated by reference herein.

TECHNICAL OVERVIEW

The technology described herein relates to machine learning, including reinforcement learning, and using machine learning to dynamically control a timer. More particularly, the technology described herein relates to dynamically adjusting a time interval or duration for how long transaction processing is delayed in a distributed system.

INTRODUCTION

Electronic systems are often configured with static values that control components of the system. For example, a system may be configured with a value to define a memory size used for an application program, to set a threshold limit for a signal-to-noise ratio in a telecommunications signal, to define a timer for how long a system operates, to set how long a stop light stays at green, yellow, and red; and many other types of systems and scenarios involving similar values exist.

One issue with statically-defined values is that they are used continually—irrespective of any surrounding environment. This type of approach can lead to inefficiencies in operation. For example, a stop light with statically defined time intervals for how long the green, yellow, and red lights stay will not react to changes in the number of cars moving through an intersection, the time of day, or other conditions.

However, making the values in such systems dynamic can often be challenging and complex due to the potentially unbounded nature of the factors that could theoretically influence how such values should be changed. Accordingly, it will be appreciated that new and improved techniques, systems, and processes are continually sought after in this and other areas of technology.

SUMMARY

In certain example embodiments, a machine learning system is provided that calculates, using a trained neural network, a timer value that is used to dynamically control a time duration of a timer used by a distributed transaction processing system.

In certain example embodiments, the time duration for which a timer is active is dynamically adjusted based on changing conditions in at least the distributed transaction processing system.

In certain example embodiments, the time duration controls how long data transaction requests (e.g., those newly received) wait until being processed by, for example, a matching engine of the distributed transaction processing system. The duration of the timer is adjusted throughout the day based on changing conditions, and different processes can use different timer durations. For example, each of multiple different identifiers may be associated with its own time duration that is adjusted based on changing conditions. In some examples, this type of approach of dynamically adjusting the duration of the timer may advantageously assist in improving execution quality of data transaction requests.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1A:
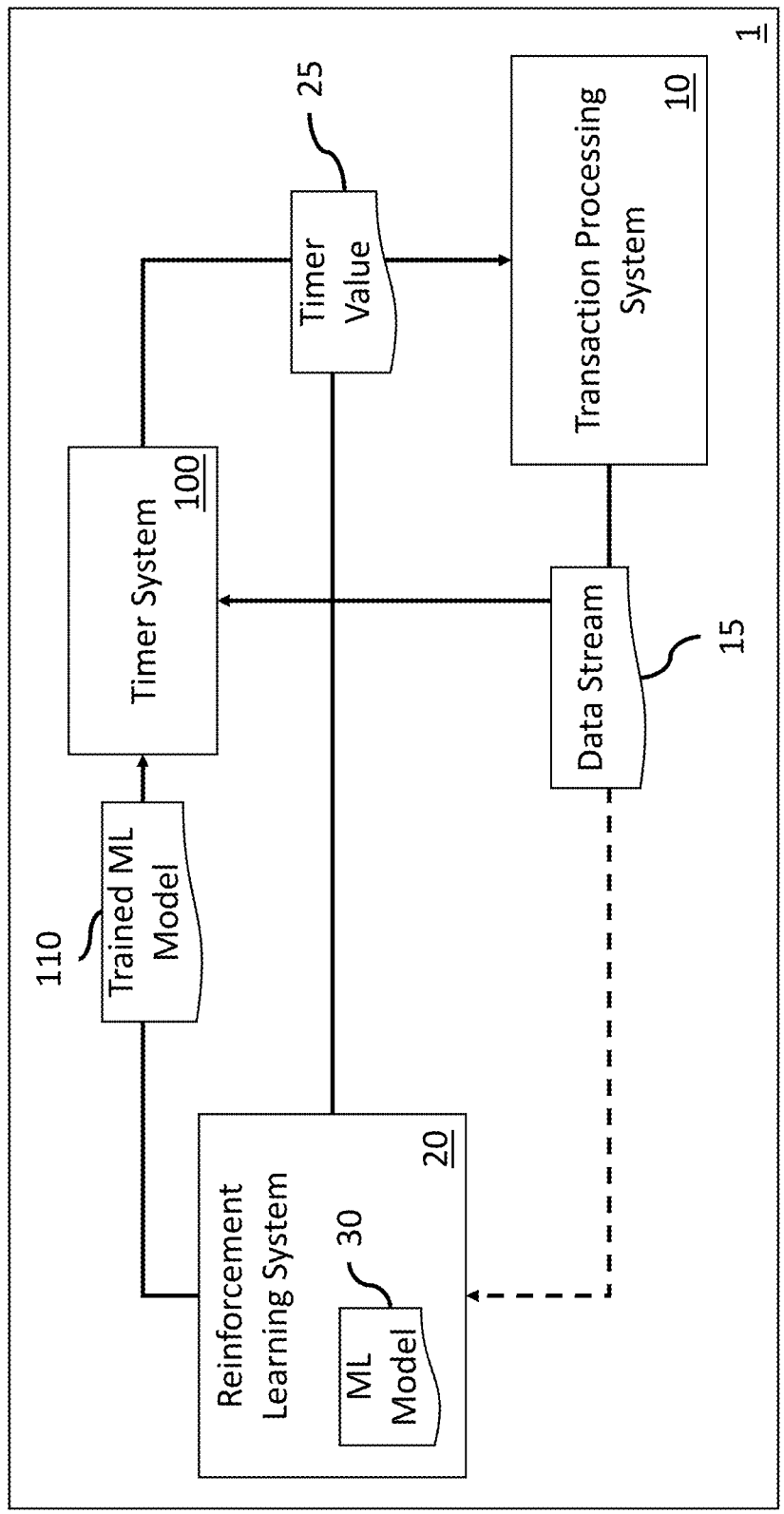
FIG. 1A is an architecture diagram of the example systems used in connection with generating training data, training models, and running the trained models to provide timers that are used by example transaction processing systems according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Some embodiments described herein relate to distributed processing systems (also called distributed computing systems) and techniques for implementing distributed processing on such systems.

Many distributed computing systems are configured to process messages that they receive—and may be referred to as distributed transaction processing systems. In particular, many distributed transaction processing systems are configured to receive and process data transaction requests and other types of requests, which specify in some fashion operations for the distributed computing system to perform (or, in some instances, to perform upon the satisfaction of certain conditions). Examples of such systems may include payment processing systems, industrial control systems, parallel scientific computation systems, distributed databases, blockchain-based smart contract systems, electronic trading platforms, and others. For example, a parallel scientific computation system may receive a data transaction request that specifies some operations to be performed in parallel; or a distributed database system may receive a data transaction request that specifies a data operation (e.g., the addition, update, or removal of some data) that should be performed on a data store managed by the database system. These and other types of distributed processing systems may benefit from the techniques described herein for how transactions that are processed by such distributed computing systems may be improved upon.

As noted above, one example type of distributed transaction processing system is an electronic trading platform. In many implementations, an electronic trading platform includes (a) one or more modules for receiving data transaction request messages, (b) one or more modules for transmitting data from the electronic trading platform to recipient systems (via e.g., "data feeds" or "electronic data feeds"), and (c) a matching engine that is used to perform data processing based on the data transaction request messages received by the electronic trading platform.

A data transaction request message received by an electronic trading platform may indicate a unique (e.g., to that electronic trading platform) reference identifier to, for example, request an order (e.g., an electronic order) be entered to buy or sell a particular asset (identified by the unique reference identifier) that is processed by that electronic trading platform. An electronic trading platform can be designed to handle data transaction request messages for many different unique reference identifiers. Such reference identifiers are commonly referred to as tickers, symbols, ticker symbols, stock symbols, and similar. These tickers are used by an electronic trading platform to uniquely identify or reference a specific security, asset, or the like for which processing is performed by the electronic trading platform. Example tickers include "AAPL", "IBM", and "KO." For ease of description herein the term "ticker" is used to refer to such unique reference identifiers.

In certain example electronic trading platform implementations, the matching engine is a module within the platform that is programmed to perform, and performs, a process to determine matches between orders. For example, if a data transaction request message is received that indicates an order to buy an asset for ticker A (and/or some quantity thereof), the matching engine may perform a process to compare the buy order against corresponding or complementary sell orders (i.e., which also reference ticker A) to determine whether a match can be made. This processing performed by matching engine to determine whether a match can be made may be referred to as "match processing" or "match operations," or as performing or executing a "matching process," or similar.

In many implementations, a matching engine maintains and/or has access to an order book data structure (which may also be referred to as an "order book") to store pending (previously received) orders that are available to match against incoming orders. In some examples, the order book data structure is used to store those orders that have been subject to a match process but have not been matched (or only partially matched) to another order. In some examples, a separate order book may be used for each ticker. For example, if two different cryptocurrencies are traded on an electronic trading platform, the platform's matching engine will maintain a separate order book for each of the two cryptocurrencies. In some examples, and as described below, different order books may be maintained for the same ticker. These different order books may hold different types of data transaction requests for the same ticker.

An order book can be structured to include two list data structures, with one of the list data structures for the buy orders and the second list data structure for the sell orders; each list in the order book may be referred to as a "side" of the order book, and the order book data structure can be referred to as a "dual-sided" data structure. In many electronic trading platforms where an order book for an asset is used, processing performed by a platform's matching engine may include use of the order book, by e.g., comparing the characteristics of a newly-received order to the characteristics of contra-side orders stored in the order book for the ticker to determine if a match can be made.

Electronic trading platforms, like other types of distributed computing systems, can be subject to challenging technical constraints. For example, many electronic trading platforms are simultaneously expected to be very high-throughput (e.g., be able to handle millions of incoming messages per second), very low-latency (e.g., be able to process each incoming message in a tiny fraction of a second <1 ms), fault tolerant (e.g., be able to continue to operate if a portion of the platform fails), resilient (e.g., be available and operate as expected when expected, even in the face of challenging conditions), and, in some instances, deterministic (e.g., given the same inputs a platform should always produce the same outputs). In some instances, how the operations of an electronic trading platform are controlled may be statically defined; e.g., there may be parameters that are used to control how the electronic trading platform operates, where the value for those parameters does not change. This is sometimes done to reduce implementation complexity and/or to improve performance of the overall system. Thus, implementation of more dynamic aspects to electronic trading platforms can oftentimes be technically challenging due to one or more of the above considerations. For example, dynamically calculating a value that was previously statically defined may require more time that may affect performance of the overall system.

In certain example embodiments, a machine learning system is provided that calculates a value to dynamically control the duration of a timer used by a distributed transaction processing system. In certain example embodiments, the duration for a timer (e.g., each or any instance of the timer) is dynamically adjusted based on changing conditions in at least the distributed transaction processing system.

In certain example embodiments, the duration a timer is active controls how long one or more data transaction requests must wait until being processed by, for example, a matching engine of the distributed transaction processing system. The duration can be adjusted throughout the day based on changing conditions and each ticker can be associated with its own timer duration that is updated dynamically.

Figure 1B:
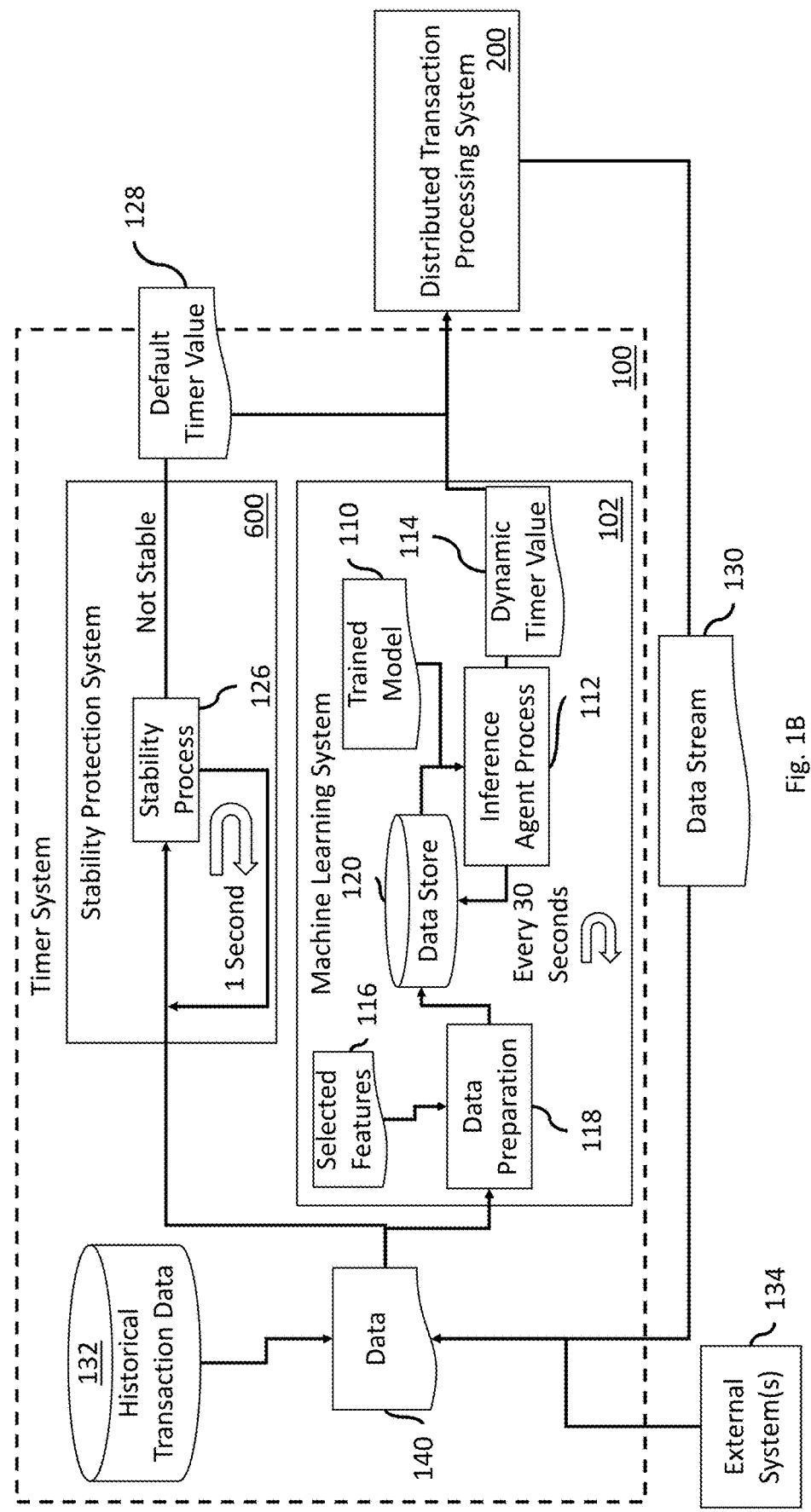
FIG. 1B is an architecture diagram of a timer system that uses a trained model to generate timer values according to certain example embodiments.
Figure 2A:
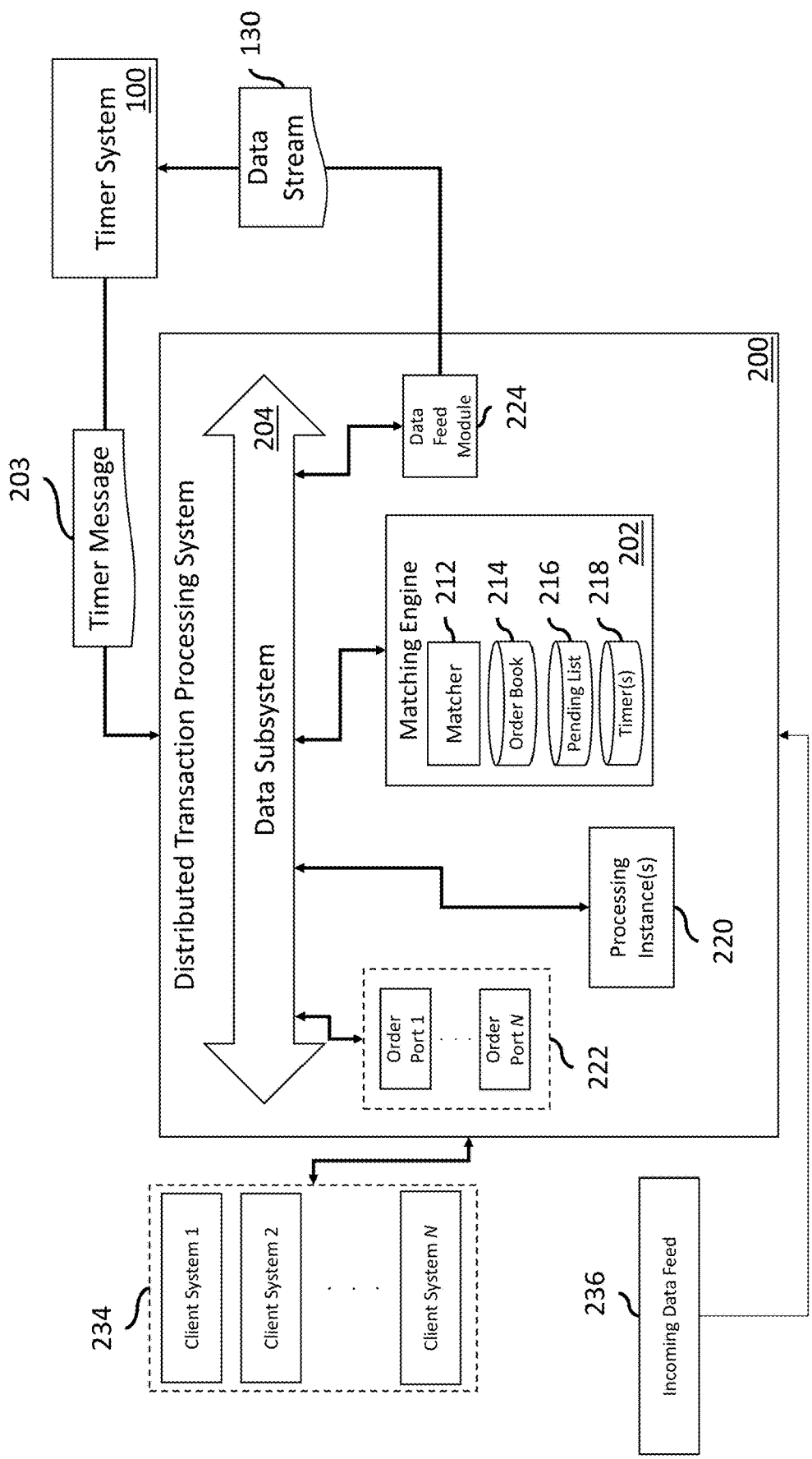
FIG. 2A is an architecture diagram that shows a distributed transaction processing system operating based on timer values provided by the timer system of FIG. 1B according to some embodiments.
Figure 2B:
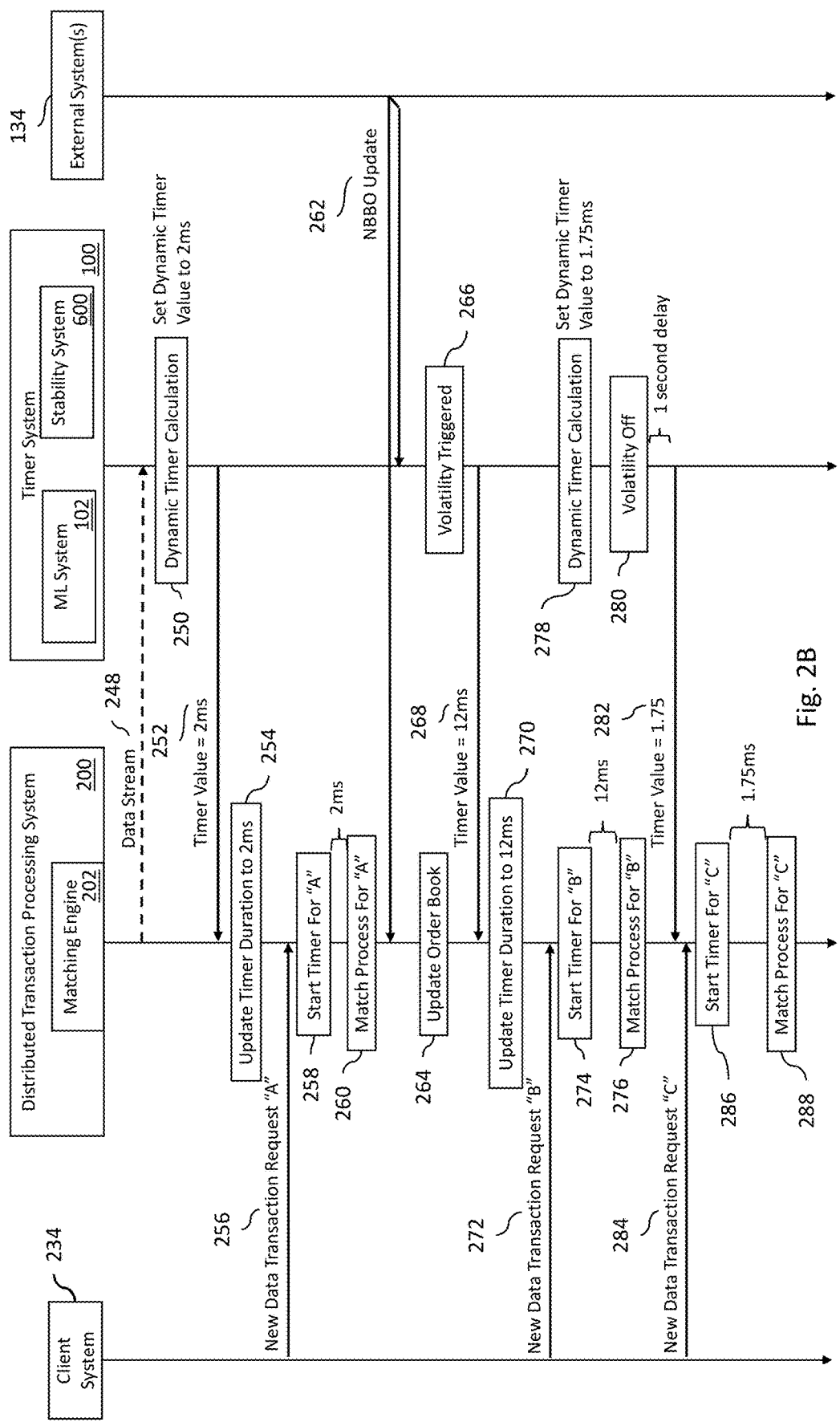
FIG. 2B is a sequence diagram showing an example implementation of how timer values on the distributed transaction processing system of FIG. 2A may be updated according to some embodiments.
Figure 3:
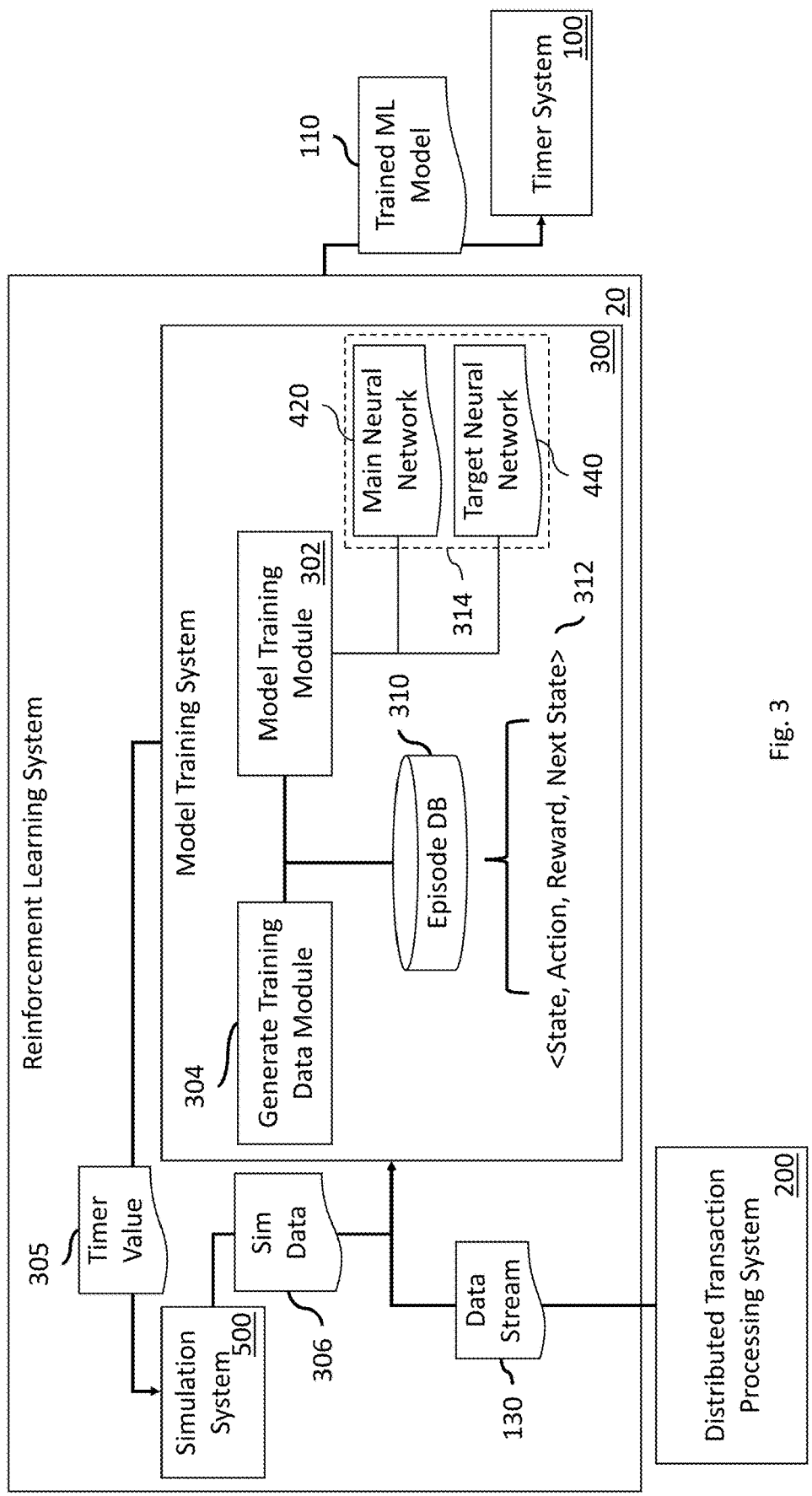
FIG. 3 shows a reinforcement learning system for training a model that is used by the system shown in FIG. 1B according to some embodiments.
Figure 4A:
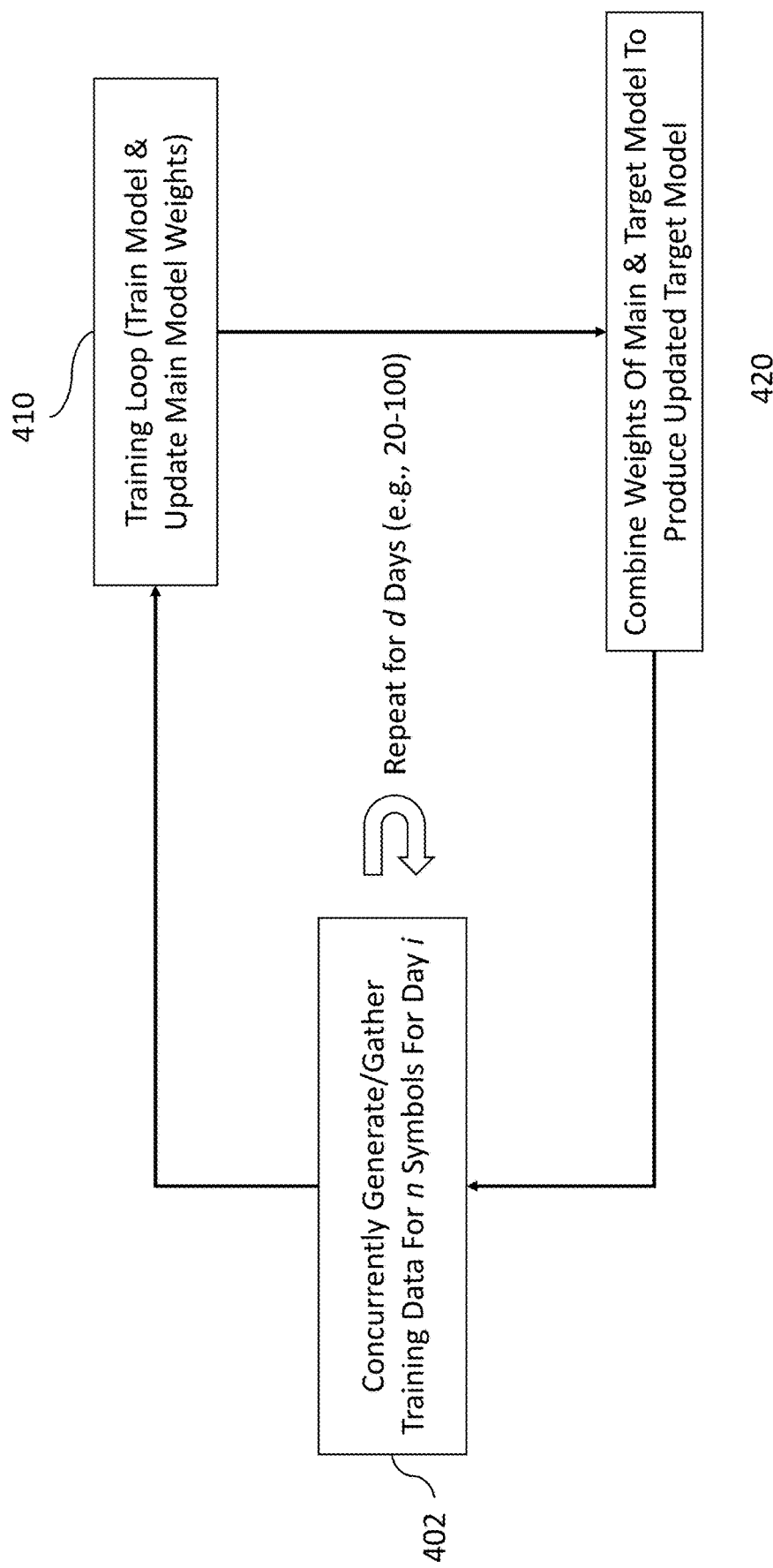
FIG. 4A is a diagram that illustrates how the model of FIG. 3 is trained and FIG. 4B is a flow chart of the training process for the model according to certain example embodiments.
Figure 4B:
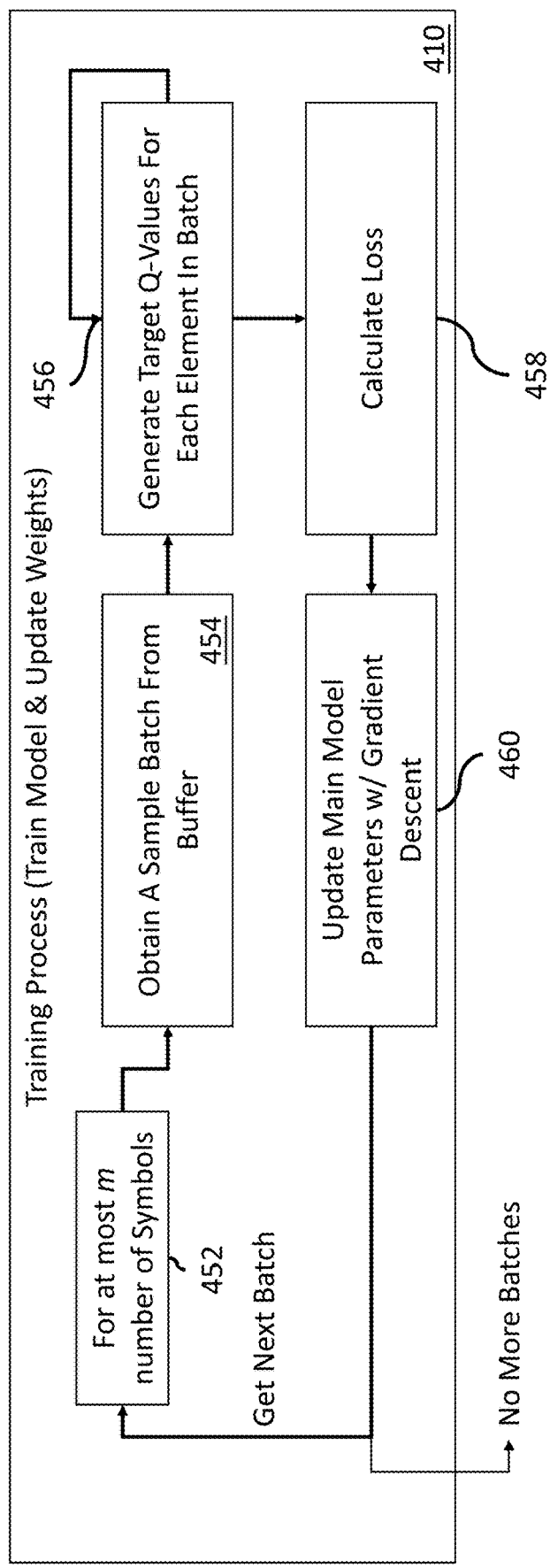
Figure 5A:
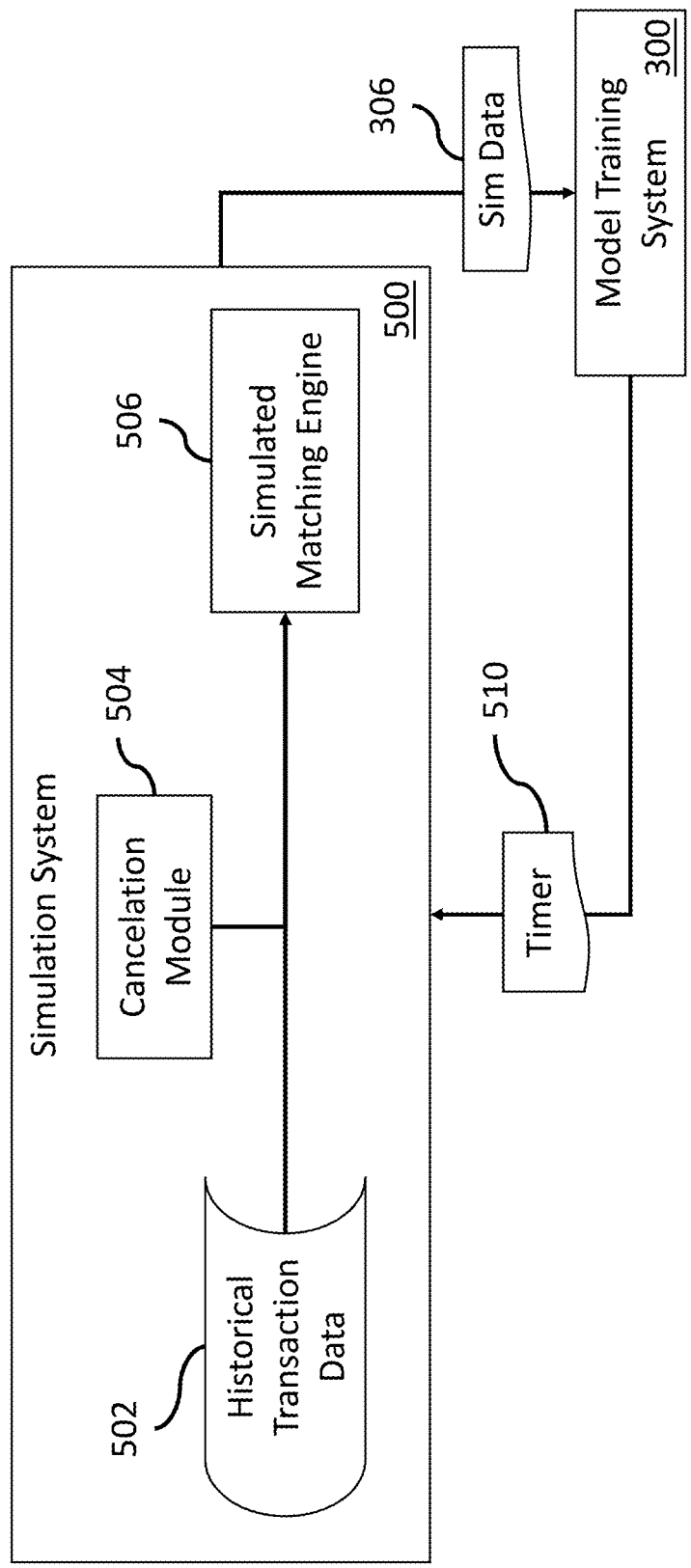
FIG. 5A is a diagram of a simulation system used to generate training data for the model training system shown in FIG. 3 according to certain example embodiments.
Figure 5B:
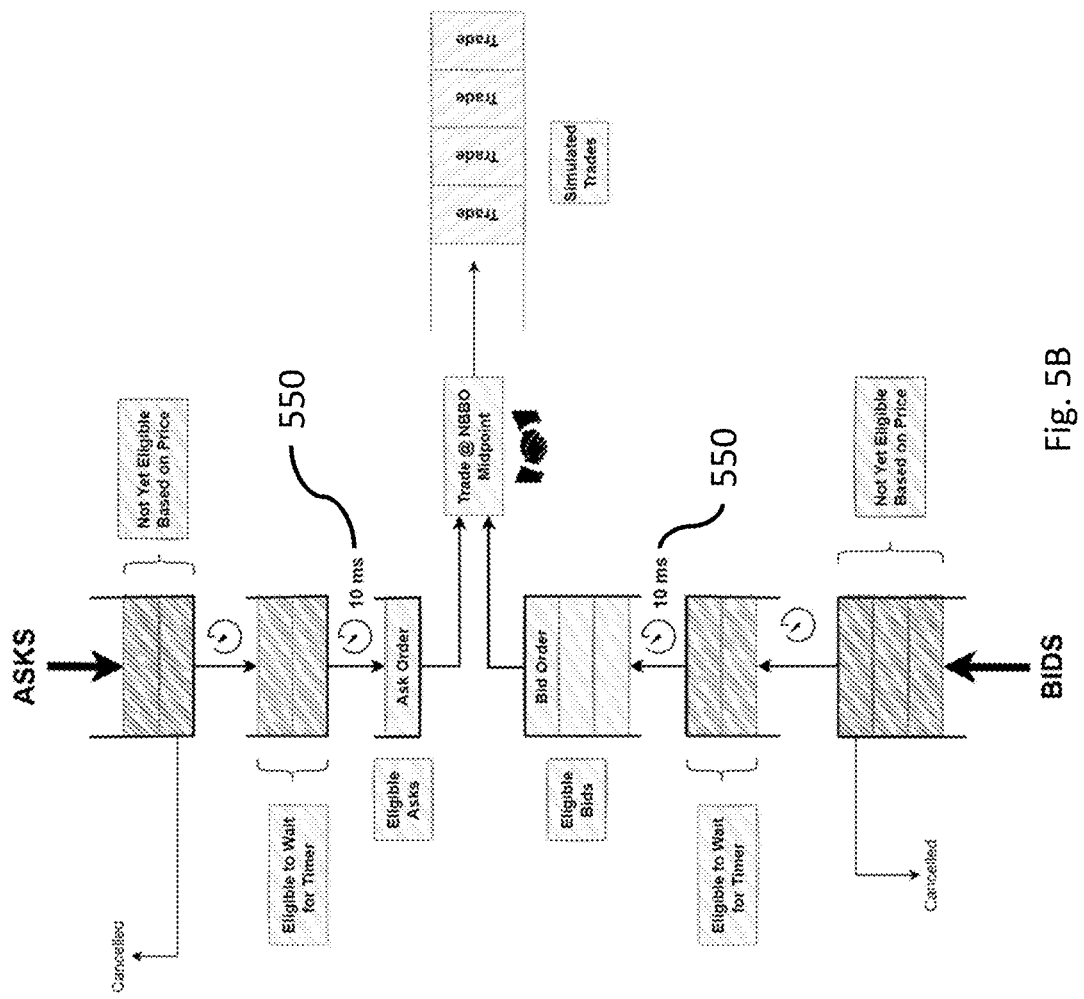
FIG. 5B illustrates how the simulation system of FIG. 5A models the generation of simulated data according to certain example embodiments.
Figure 6:
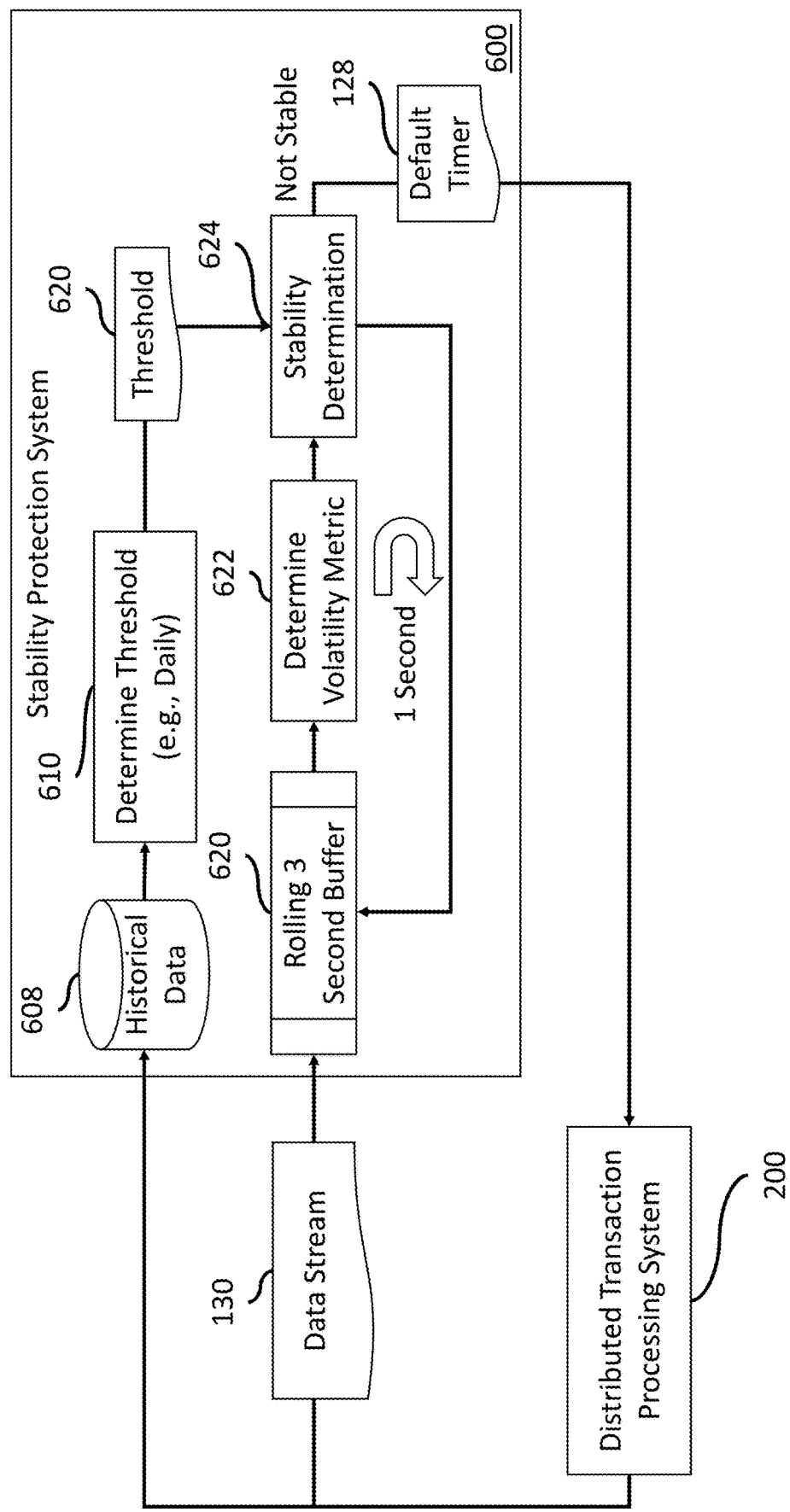
FIG. 6 is a system diagram of the stability protection system that is shown in FIG. 1B according to certain example embodiments.
Figure 7A:
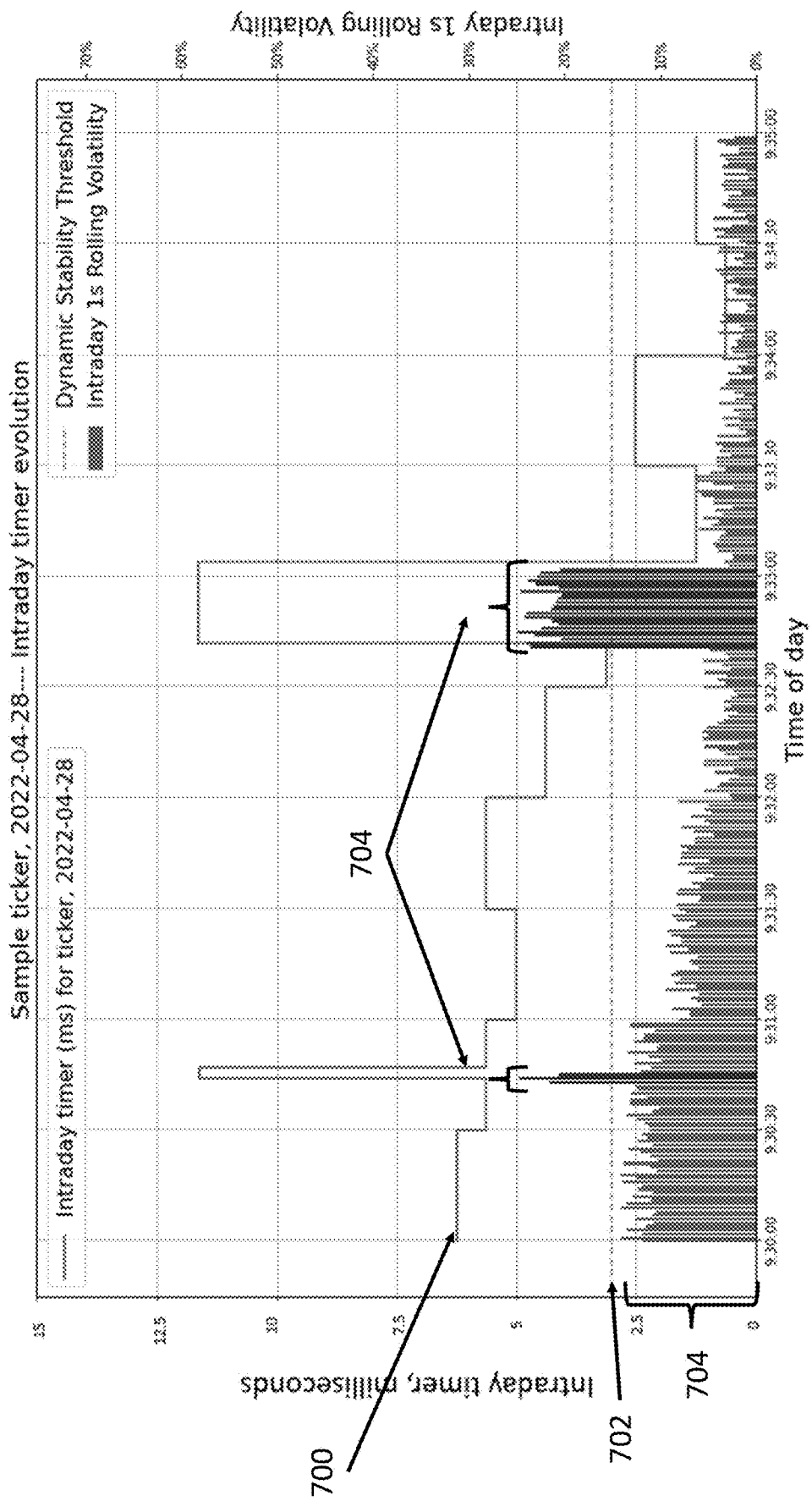
FIG. 7A is chart that illustrate the relationship between timer length and volatility according to certain example embodiments.
Figure 7B:
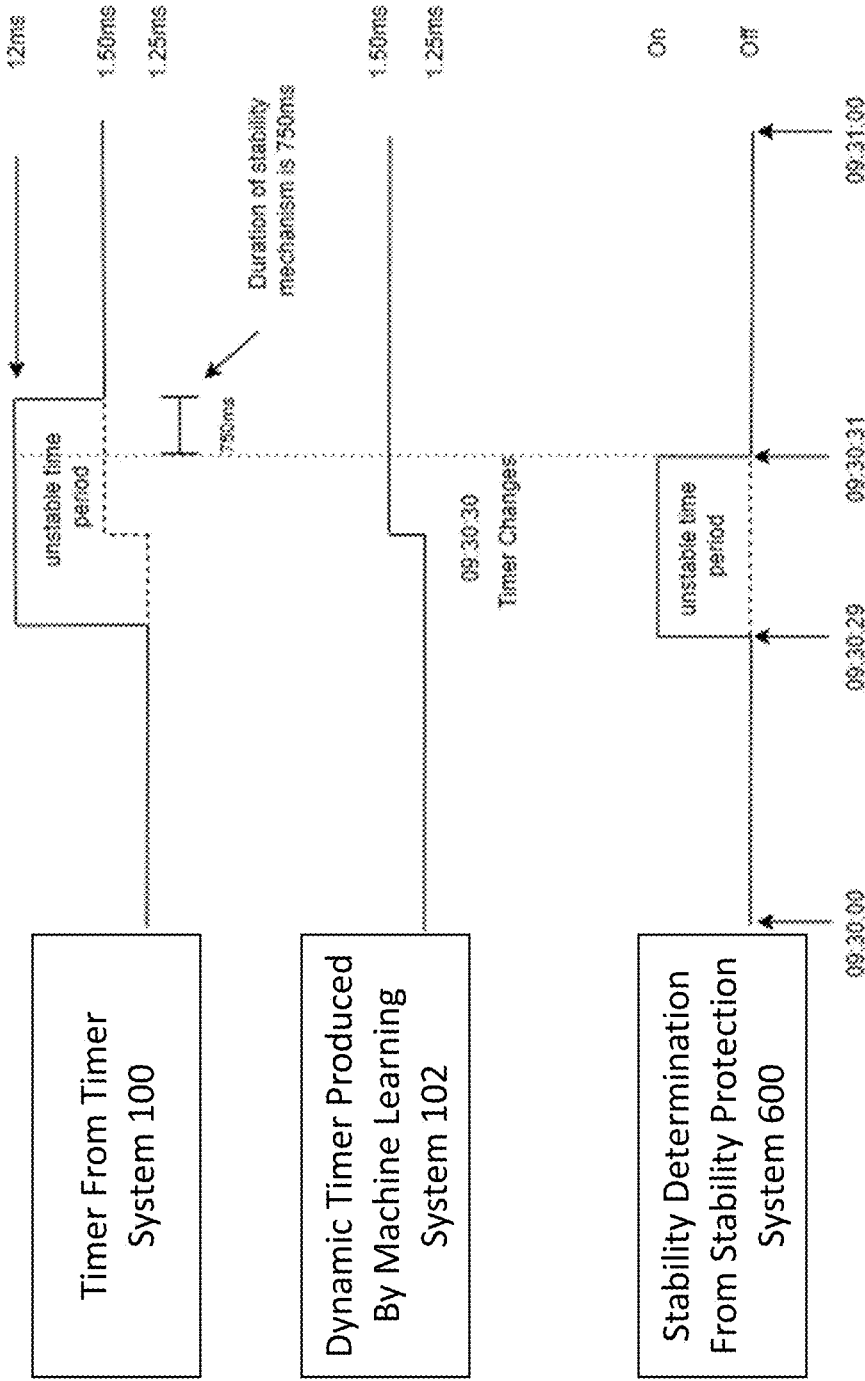
FIG. 7B illustrates an example of the relationship between the dynamic timer produced by the machine learning system of FIG. 1B, the stability protection system of FIG. 6, and the timer communicated to the distribution transaction processing system of FIG. 2A.
Figure 8:
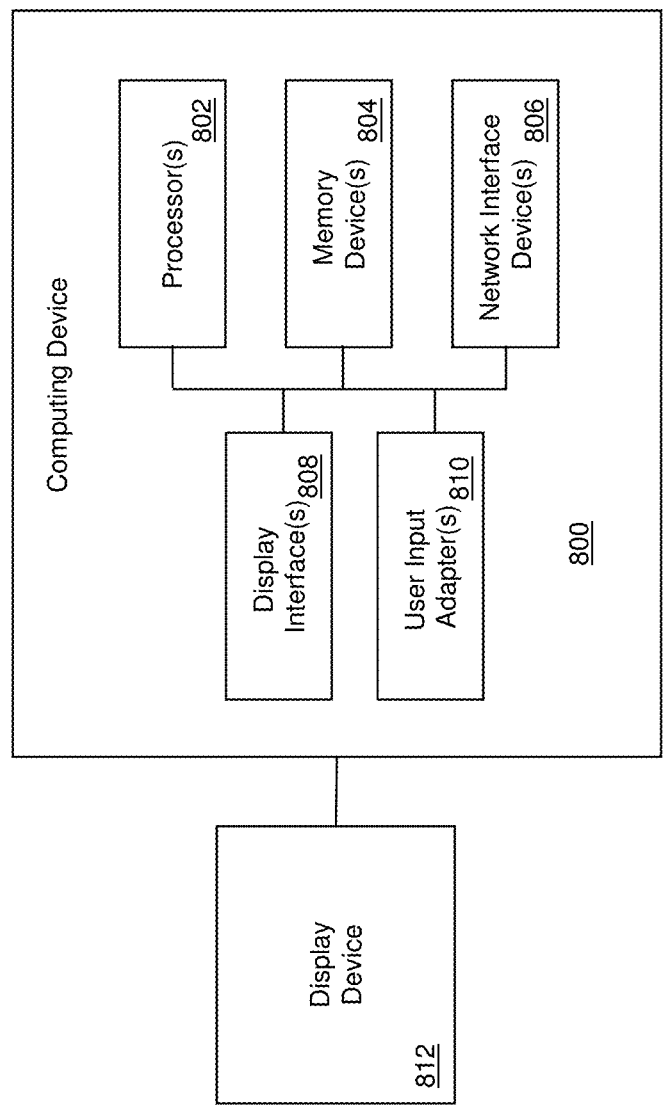
FIG. 8 shows an example computing device that may be used in some embodiments to implement features described herein.

FIG. 1A is a high-level system diagram of the various systems that are used in connection with the example embodiments discussed herein; the systems shown in FIG. 1A include (a) reinforcement learning system (which is used to produce a trained machine learning model), (b) a timer system (which uses the trained machine learning model to dynamically generate timer values), and (c) a transaction processing system (in which the generated timer values are used). FIG. 1B shows details regarding an example of the timer system, and FIG. 2A shows details regarding an example of the transaction processing system (in this instance, a distributed transaction processing system). FIG. 2B is a sequence diagram that shows how the timer values generated by the timer system are used in connection with data transaction requests processed by the distributed transaction processing system of FIG. 2A. FIG. 3 shows a reinforcement learning system used to train a neural network model that is used by the example timer system of FIG. 1B. FIGS. 4A-4B illustrate the training processes used by the reinforcement learning system to train the neural network. FIGS. 5A-5B show the simulation system used to generate training data for, at least initially, training the neural network with the reinforcement learning system. FIG. 6 shows details regarding an example of the stability protection system; this example stability protection system can override the timer values produced by the neural network used by the timer system in FIG. 1B. FIGS. 7A and 7B are graphs that illustrates the relationship between volatility calculated by the stability protection system of FIG. 6 and the timer value(s) communicated by the timer system in FIG. 1B to the distributed transaction processing system of FIG. 2A. FIG. 8 shows an example computing device that may be used for the various systems shown herein, including the timer system of FIG. 1B, the reinforcement learning system of FIG. 3, and the distributed transaction processing system of FIG. 2A an electronic trading platform, where one or multiple such devices may be used to implement the system(s).

In many places in this document, software (e.g., modules, software engines, processing instances, services, applications, and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 8.

Description of FIG. 1A

FIG. 1A is an architecture diagram that provides an overview of the multiple different systems used in connection with the example embodiments described herein. The details of these systems, the processing performed by such systems, and how communication is handled between such systems, are discussed in greater detail below.

The technological architecture used to implement the various aspects described herein may be provided by distributed computing system 1. The distributed computing system 1 may include one or more subsidiary systems. Such subsidiary systems may include timer system 100 (discussed inter alia in connection with FIG. 1B), a transaction processing system 10, and reinforcement learning system 20 (discussed inter alia in connection with FIGS. 3-4B).

In some examples, the transaction processing system 10 may be a distributed transaction processing system 200 that operates on "real" or live data (discussed in greater detail inter alia in connection with FIG. 2A). In some examples, the transaction processing system 10 may be a simulation of such a system, such as simulation system 500 (not depicted in FIG. 1A; discussed in greater detail inter alia in connection with FIGS. 5A-5B).

In certain examples, the reinforcement learning system 20 uses data from the data stream 15 (and, in certain examples, other data) to train (e.g., by using reinforcement learning techniques) a neural network (ML model 30) that results in a trained ML model 110. As described in greater detail inter alia in connection with FIG. 3, the reinforcement learning system 20 gradually adjusts the weights and other parameters of a neural network that is used to produce a timer values 25 used, by the transaction processing system 10, to generate further data for the data stream 15 that is then used to further update the ML model 30. This loop continues until the trained ML model 110 is produced.

The trained ML model 110 that is produced by the reinforcement learning system 20 is communicated to the timer system 100. The timer system 100 uses the data of data stream 15 to perform machine learning inference to generate timer value 25.

As noted above, the transaction processing system 10 may be, in certain examples, distributed transaction processing system 200. In such cases, the timer value 25 is used by the transaction processing system 10 to control when the transaction processing system 10 processes new data transaction requests. In other words, the timer value 25 can be used in the distributed data transaction processing system 10 to set a duration for a timer used within data transaction processing system 10; the timer may be used to determine how long newly received data transaction requests are held before being processed (e.g., used in a matching process) by the transaction processing system 10.

It will be appreciated that multiple timer values may be generated and communicated by the timer system 100. The use of "Timer Value 25" in FIG. 1A is provided for ease of description; and it should be understood that in some embodiments, and as described in greater detail below, the timer system 100 may generate multiple timer values that are used by the transaction processing system 10 (e.g., each being an instance of Timer Value 25). For example, each ticker may have its own Timer Value 25 communicated for it.

The resulting processing performed by the transaction processing system 10 produces yet further data for the data stream that may then be used by the reinforcement learning system 20, the timer system 100, or both.

It will be appreciated that the processing shown in FIG. 1A may, in certain example embodiments, relate to training a model with the reinforcement learning system 20, and also to deploying the model to the timer system 100. In these cases, the transaction processing system 20 may be either a simulated environment (such as simulation system 500) or a production or "live" environment (such as distributed transaction processing system 200). In the case of the training process that involves the reinforcement learning system 20, it may be problematic to use a production or "live" environment while the ML model 30 is being initially trained. Accordingly, simulation system 500 may be used to generate the training data (e.g., represented as data stream 15 in FIG. 1A) that is used to initially train the ML model 30. Once a model has been sufficiently trained (e.g., trained ML model 110), it may then be used in connection with the distributed transaction processing system 200.

Subsequent retraining or training of the ML model 30 may use data (e.g., represented as data stream 15 in FIG. 1) generated by the distributed transaction processing system 200. In some examples, the simulation system 500 may not be used. In other examples, the simulation system 500 may still be used and, as discussed in connection with FIG. 5A, be used to modify the data generated by the distributed transaction processing system 200 (e.g., to test and learn from alternative timers) as part of the retraining (or new training) of ML model 30. It will be appreciated however, that in such a case timer value 25 is not communicated to the distributed transaction processing system 200 from the reinforcement learning system 20 during the retraining process. This is because timer values are already associated with the data produced by the distributed transaction processing system 200 (i.e., because the timer system 100 produced such timer values) and/or the reinforcement learning system 20 (e.g., the agent thereof) as provided new timers to the simulation system 500.

Additional details regarding each of these subsidiary systems (timer system 100, distributed transaction processing system 200, reinforcement learning system 20, simulation system 500, and any system that is included in such systems) and the processing that is performed on these systems is discussed in greater detail below.

In certain example embodiments, the distributed computing system 1, and each of the subsidiary systems, may include or be composed of one or more computing nodes. In some embodiments, a computing node may be implemented using the example computing device 800 of FIG. 8. Each computing node may include its own computing resources (e.g., hardware components such as electronic memory or storage, input/output (I/O), hardware processors, and the like). In some embodiments, the computing nodes that comprise the distributed computing system 1, and/or the various systems included therein, may be referred to herein as the "computing resources" of the distributed computing system 1.

Description of FIG. 1B

FIG. 1B is an architecture diagram showing an example of how the timer system 100 may be implemented. The timer system 100 may include two systems, machine learning system 102 and stability protection system 600. In some examples, the timer system 100 may be implemented using techniques discussed in U.S. application Ser. No. 18/110,967, the entire contents being hereby incorporated by reference.

The machine learning system 102 is configured to perform a dynamic timer process that includes executing a trained model 110 on data 140 that is received/processed in order to generate a dynamic timer value 114 that is provided to the distributed transaction processing system 200 for use thereon. More specifically, the machine learning system 102 uses, as part of the dynamic timer process, generated feature values to perform machine learning inference yielding an output signal (e.g., a number) from trained model 110 that indicates a relative change for a dynamically tracked timer value.

The dynamic timer value 114 produced by the dynamic timer process of the machine learning system 102 may be communicated to the distributed transaction processing system 200 may be a relative value (e.g., +/− some time such as 0.25 ms, 0.5 ms etc.) or absolute (e.g., 0.5 ms, 1 ms, 5 ms, etc.). The nature of the value that is communicated may be based on how the model 110 is trained (e.g., as discussed in connection with FIG. 3), the signal output from the model, and/or other processing that may be performed. In some examples, the timer system 100 maintains a database or list of different timer values that are used for each ticker and/or the various processes performed by the distributed transaction processing system 200. Accordingly, each ticker for which the distributed transaction processing system 200 performs match processing (e.g., as discussed in connection with FIG. 2A) may have a differently maintained and tracked dynamic timer value. The data for such dynamic timer values 114 may be stored in memory of the timer system 100. Each of these dynamic timer values may change depending on the data stream from the distributed transaction processing system 200 that is produced in connection with how data transaction requests are processed for those tickers (and potentially other data) and the subsequent inference processing that is based on such data.

In certain example embodiments, having the timer system 100 track and maintain the dynamic timer value 114 may be beneficial as the distributed transaction processing system 200 does not need to be responsible for storing, tracking, or updating the timer values based on the output from the inference process. Rather, the distributed transaction processing system 200 may use the current dynamic timer value that is communicated to it (e.g., without having to know a prior value of the timer). However, in other examples, the distributed transaction processing system 200 may track the timer values and update such values based on messages that contain the relative changes for duration that are received from the timer system 100.

The timer system 100 may also include a stability protection system 600. As discussed inter alia in connection with FIG. 6, the dynamic timer value 114 that is produced by the machine learning system 102 can be overridden during periods of sufficiently high levels of volatility. When such high volatility is detected, a default timer value 128 can override or supersede the dynamic timer value 114 that is produced by the machine learning system 102. In certain examples, the stability process 126 that is executed by the stability protection system 600 is executed at a quicker/faster rate than the machine learning system 102. For example, the stability process 126 may be executed at a rate of once per second while the inference agent process 112 may be used to provide new dynamic timers once every 30 seconds. In other examples, the rate at which stability is checked may be 10 to 30 times more frequent than the rate at which the dynamic timer is updated. In some examples, the machine learning system 102, and/or processes thereof, may continue to execute and generate new dynamic timer values based on the inference process even when the default timer value is triggered. Additional details of the stability protection system 600 are discussed in connection with FIG. 6 and other places herein.

Returning to the machine learning system 102, this system operates based on data 140, which is composed of data stream 130 from the distributed transaction processing system 200, data provided by one or more external system(s) 134, and/or historical data 132 (which may be maintained in a database, data lake or other similar data store and may be considered the historical culmination of data from distributed transaction processing system 200 and external systems 134).

In some examples, data provided by the one or more external system(s) 134 may include the National Best Bid and Offer (NBBO) for each ticker for which timer values are being generated by the timer system 100. The NBBO is a quote that reports the highest bid (buy) price and lowest ask (sell) price for a given ticker. This value is based on and sourced from among all available exchanges or trading venues. Accordingly, the one or more external system(s) 134 may include other exchange trading systems or platforms, or the like. In some examples, the one or more external system(s) 134 may include, for example, Securities Information Processors (e.g., Consolidated Quotation System (CQS) and Unlisted Trading Privileges (UTP) Feeds such as the Quotation Data Feed (UQDF) and the Trade Data Feed (UTDF)), and others.

The NBBO is an example of a value that dynamically changes over time based on the state of all pending orders that are for a given ticker at a given time. This dynamically determined value may be provided via one or more external system(s) 134 and may be based on the state of the order book data structure stored by the distributed transaction processing system 200 for a given ticker (e.g., the NBBO for that ticker) and/or based on the state of other order books or orders for that ticker of other exchange computer systems.

The type of data that is processed by the machine learning system 102 may be dependent on the selected features 116 that have been identified and are of interest for the inference that will be performed using the trained model 110.

In certain examples, the features identified as part of the training process in connection with certain example embodiments include at least 100 different features. In certain examples, 142 different features are used, with 27 generally associated with higher (slower) timers and 25 features generally associated with lower (faster) timers. Some features include data related to the number of shares per match/trade (e.g., median, min, max, etc.), NBBO values, the number of unique participants placing orders, the volume-weighted average of the spread (e.g., the NBBO spread), the number of resting bids or asks in the order book, and others. Note that different types of problems being addressed by the timer system 100 may require different types of features. For example, if the timer system 100 is used to determine the length of time that a stop light should remain at red, then the features that may be used may include and/or relate to the time of day and the weather.

In any event, the selected feature list 116 that is used by the machine learning system 102 may be discovered or defined as part of the reinforcement learning process (discussed below). Based on the selected features 116 and the data 140 that is provided to the machine learning system 102, the data preparation module 118 transforms data 140 into feature values that are stored in data store 120. The data store 120 is periodically accessed or queried by the interface agent process 112 to produce an output signal from the trained model 110 that is used to generate the dynamic timer value 114.

As an example of this transformation process from data 140 to dynamic timer value 114, if one of the features is a rolling average volume over the last 5 minutes, then the value for that feature may be calculated by data preparation module 118 from data 140. For example, a rolling 5 minute buffer may be used to hold data related to that feature and a running calculation of the rolling average may be determined at every x time frame, or when any new data is received related to that calculation. The resulting value that is calculated for that feature (the rolling average) may then be stored to data store 120 on a periodic or continuous basis. This value will then be one of the values of an n-dimensional vector (where n is the number of selected features 116) in the n-dimensional feature space that makes up the state of the environment (e.g., of the distributed transaction processing system 200) at a given point in time (t). This environment state is used to derive the action (e.g., a timer value or a relative adjustment to a timer value) that is selected through the inference agent process 112.

As noted above, there may be hundreds of different features that are of interest and the processing performed by the data preparation module 118 may be substantial. This may be because all transactional data from the distributed transaction processing system 200 over the last 30 seconds needs to be processed in order determine/update the feature values for the selected features. As an example, one message in the data stream 130 may be that a trade occurred for 1000@150 for ticker AAPL. There may be hundreds, or potentially thousands, of such messages (for AAPL trades) that need to be accounted for in that 30 second time period in order to determine the rolling average volume (or any other feature) for the next iteration of the inference agent process 112.

The scope of the computations that are performed within that 30 seconds (or other time period) is further compounded due to the machine learning system 102 determining dynamic timer values for hundreds (or thousands) of different tickers. Accordingly, continually processing the data for such feature values can be computationally intensive. To address such computational problems, in certain examples, the data preparation module 118 can be instantiated across tens, hundreds, or even thousands of different worker instances (also called worker processes) in a cloud-based computing environment, a distributed computer system, or the like. With such an implementation, the different worker instances for the data preparation module 118 can be used to concurrently process data related to the selected features 116 on an ongoing, continuous, or other basis.

In addition to data received via data stream 130, other data may also be received from external systems 134. Such data may factor into the calculations performed by the data preparation module 118. For example, the current (min/max/average or other value) associated with the NBBO for a given ticker may be determined by the data preparation module 118. It will be appreciated that the machine learning system 102 is designed to handle other types of data that may be relevant to the output signal being generated from the trained model 110. Other types of data could include, for example, different market data feeds, weather data, traffic data, baseball scores, batting averages, and the like. Accordingly, it will be appreciated that the type of data that is ingested for use by the machine learning system 102 may be diverse in nature depending on the type of machine learning problem that is being addressed.

The data that is calculated/transformed by the data preparation module 118 is stored into data store 120. This may be a continuous process over the entire operational span of the machine learning system 102. In other words, the data preparation module 118 may run continuously as new data 140 is received and provide continuous updates in connection with the relevant feature values that are stored into the data store 120.

In certain example embodiments, data is written to the data store 120 asynchronously in comparison to how data is retrieved from the data store 120 by the inference agent process 112. This type of approach may allow for the inference agent process 112 to be adjusted to poll the data store 120 more or less frequently. For example, the inference agent process may be run once every 15 seconds at some points during the day, every 30 seconds during others, and every minute during the remaining time periods. In some examples, the update rate of the inference agent process 120 may be different depending on the ticker.

The machine learning inference task is carried out by the inference agent process 112. Specifically, the inference agent process 112 loads the trained model 110 and then may query or otherwise access data store 120 once every 30 seconds (or other time period as defined, such as 5 seconds, 10 seconds, 1 minute, etc.). As discussed herein, the trained model 110 that is used may be a deep neural network that includes tens or hundreds of different features (e.g., a state size of at least 25, 50, or 100) and at least 3 different layers that result in an output that represents a relative change for to dynamic timer value 114. In certain examples, there may be over 30000 different weights that are contained within the trained neural network. In some examples, the number of weights included in a neural network may be between 10,000 and 100,000, with over 100,000 in some instances.

In some examples, the output signal that is produced by the inference agent process 112 may be one of a plurality of different possible outputs. In general, the number of different outputs may depend on the nature of how model 110 has been trained. In certain examples, the output signal from the model may be viewed as one of 5 different options, with the options each being represented in the output signal as a different number. In certain examples, the output may be further modified. For example, the model may output a signal that represents one of the five following numbers, -2, -1, 0, 1, and 2. These may be further modified by a step function to obtain a relative timer adjustment (e.g., one of multiple possible actions to take in connection with adjusting the timer). The step function may be linear, exponential, logarithmic, or another function. For example, -2*step, -step, 0, step, 2*step, with "step" being a defined value (e.g., a constant). In some examples, the step value may be 0.25 ms, 0.1 ms, or other time value. The resulting adjustment to the dynamic timer value may then be applied to a prior timer value (e.g., that is stored in memory of the timer system 100), for example:

$$\text{DynamicTimerValue}_t = \text{DynamicTimerValue}_{t-1} + \text{Timer}_{adjust}$$

While all tickers may use the same step value in certain examples, in other examples, different step values may be used for different ones of the tickers for which a dynamic timer 114 is calculated. For example, some tickers may have a finer grain timer step function (e.g., 0.1 ms), while others may have a coarser grained adjustment (e.g., 0.5 ms).

In certain example embodiments, the machine learning system 102 may bound the dynamic timer between a range of values. As an example, valid values may be between 0.25 ms and 2.5 ms. Accordingly, with a step value of 0.25, the dynamic timer may range between one of 10 different values between those ranges. In certain instances, 0.25 ms was observed to be a relatively lower value that could be used for a timer that still maintained the goals of the timer implementation on the distributed transaction processing system 200. In some examples, the same range is used for all tickers and all calculated dynamic timer values 114. In other examples, different ranges may be used depending on the time of day and/or the ticker. In some examples, different tickers may have different ranges. For example, one ticker may have an upper bound of 5 ms, another 2.5 ms, and another 10 ms.

In general, the same trained model 110 may be used for all of the calculated dynamic timer values 114. In other words, the model remains the same (e.g., the same weights for the nodes of the neural network, etc.) for all timer determinations while the feature values that are used for inference are different (e.g., because the state of the environment, which is represented by the features, for individual tickers may be different). Accordingly, for example, there may be many different timer durations being used concurrently by the distributed transaction processing system 200 for different ones of the tickers that are being processed. Each of the timer durations for those tickers may be updated independently of other timer durations for other tickers.

In some instances, different trained models may be used in connection with different types of tickers that are processed by distributed transaction processing system 200. For example, ETFs or other types of securities may have different market dynamics and thus having a different trained model for such tickers may result in beneficial performance. Accordingly, in certain examples, one trained model may be used for traditional stocks (e.g., AAPL) and another used for ETFs (e.g., SPY). The machine learning system 102 may therefore support using multiple different trained models.

In certain example embodiments, the dynamic timer value 114 may be initialized to a starting value at the beginning of each day (e.g., each trading day). In other words, prior to the distributed transaction processing system 200 performing match processing at the beginning of the day (e.g., 930 am), an initially set dynamic timer value 114 may be communicated to the distributed transaction processing system 200 to thereby set the duration of the timer to the dynamic timer value 114. Therefore, updates to the dynamic timer value 114 may be determined as discussed herein (e.g., based on machine learning inference). In certain examples, a value that is at or near the midpoint of a dynamic range (e.g., between 0.25 ms and 2.5 ms) may be used as the initially set dynamic timer value 114. For example, 1.25 ms may be used in certain examples.

In certain example embodiments, each update to the dynamic timer value 114 may then be communicated to distributed transaction processing system 200. As an example, if the inference agent process 112 is performed once every 30 seconds to generate an update to dynamic timer value 114, a corresponding message may be communicated to distributed transaction processing system 200 that reflects the new dynamic timer value 114. In certain examples, a message is communicated to distributed transaction processing system 200 even if there is no change to the dynamic timer value 114. For example, if the resulting inference process indicates a change of 0 ms, then the dynamic timer value 114 may not be changed, but a message may still be communicated to the distributed transaction processing system 200 with the dynamic timer value 114 as of that new determination.

Alternatively, if the outpoint signal from the model indicates no change to the dynamic timer value from a previous value, then no message may be generated and communicated to the distributed transaction processing system 200.

Description of FIG. 2A

FIG. 2A shows an example distributed transaction processing system architecture that operates based on dynamic timer values provided by the timer system 100 of FIG. 1 according to some embodiments.

The distributed transaction processing system 200 may be implemented in some embodiments as an electronic trading platform (which may also be referred to as a "transaction processing system," an "electronic exchange," "electronic trading system," "trading system," "platform," or similar), and may be configured to receive, transmit, and process messages (which may also be referred to as "electronic messages," "electronic data messages," or similar).

Example protocols in which electronic messages may be communicated to/from the distributed transaction processing system 200 include the OUCH protocol, the Financial Information eXchange (FIX) protocol, the ITCH protocol, and/or the SOUP protocol (e.g., SoupBinTCP). Other protocols for communicating electronic messages, such as UDP and TCP, may also be used in certain examples. Different types of messages may be communicated using different protocols. For example, timer message 203 may be communicated using TCP, while messages that are part of or otherwise form the data stream 130 communicated using ITCH, and messages communicated from client systems 234 using FIX or OUCH.

Some of the messages that the distributed transaction processing system 200 may receive and process may be data transaction request messages (which may also be referred to as "requests," "request messages," "data transaction requests," "order messages," "electronic orders," "electronic order messages," "data operation request messages," "data operation requests," or similar), which indicate a request for the distributed transaction processing system 200 to take some action (such as place an order, cancel an order, etc.). Data transaction request messages may also include, for example, the alpha or alphanumeric identifier for a specific ticker (e.g., "AAPL"). This may be used to differentiate or segregate messages related to specific tickers within the distributed transaction processing system 200.

The distributed transaction processing system 200 may be configured to receive electronic messages from client system(s) 234 (e.g., using SOUP, FIX, etc.), incoming data feed(s) 236 (e.g., which may include other exchange computer systems and/or data stream providers), and/or timer system 100. An example of such an electronic message received from one of the client systems 234 may be a data transaction request message to place an order for a given ticker (e.g., buy 100 shares of AAPL @ 150). An example of messages received via incoming data feed(s) 236 may be messages that include data for the national best bid and offer (e.g., an update to the NBBO). An example of a message from timer system 100 may be timer messages 203. Each of these messages will be received and then processed, as needed, by the components of the distributed transaction processing system 200 (e.g., by being distributed to such components using the data subsystem 204).

The distributed transaction processing system 200 includes a matching engine 202 for matching data transaction requests, a data subsystem 204 for communicating messages between components or computing processes of the distributed transaction processing system 200, processing instance(s) 220 that are configurable to perform additional tasks within the distributed transaction processing system 200, order ports 222 for receiving and processing messages from external systems (including client systems 234), and data feed module 224 for communicating to external systems (such as timer system 100).

The matching engine 202 of the distributed transaction processing system 200 is configured with a matcher 212 that is responsible for matching data transaction requests (e.g., orders) to one another. The matcher 212 operates a matching process that is used to determine if there is a match between two contra-sided orders for a given ticker. For example, the matching process may determine if a buy order for AAPL matches any given sell order for AAPL (or if a sell order matches any other buy order). The matcher 212 may operate in conjunction with an order book 214, a pending list 216 to hold a list of data transaction requests, and timers 218, which may be a database of duration values that are used for timers in connection with pending data transaction requests for each ticker. Details of the pending list 216 and timers 218 are discussed in greater detail below.

Order book 214 is a data structure (e.g., a database, flat file, list, etc.) that holds multiple entries in electronically accessible memory (e.g., RAM, cache, registers, hard disk drives, etc.). Typically, an order book has two sides, side X and side Y, with one side being "contra" to the other side. For example, one side is bid/buy side and the other side is the offer/sell side for the same instrument in the order book 214. The two sides of the order book may be represented as a list pair data structure (one list for the buy side and one list for the sell side). In certain examples, each list of the list pair may be sorted according to one or more attributes of the orders that are part of the respective lists. For example, the orders in the lists may be sorted according to a price value of the order and then according to a timestamp for the order (or sorted by just the timestamp). Thus, if two orders have the same price value, the one with the earlier timestamp will be sorted "higher" into the list.

FIG. 2A shows a single matching engine 202; however, in some embodiments the distributed transaction processing system 200 may include multiple matching engines in addition to the matching engine 202 (e.g., the distributed transaction processing system 200 may include two, or three, or in some embodiments up to a few dozen matching engines); in such instances, processing load may be distributed across the matching engines (e.g., each may handle some subset of the tickers handled by the distributed transaction processing system 200), and/or different matching engines may handle different kinds of processing (e.g., some matching engines may handle the processing of submitted data transaction requests that are associated with a delay time while other matching engines may handle the processing of submitted data transaction requests that are not associated with a delay time).

In some examples, the distributed transaction processing system 200 may include a sequencer (not shown in FIG. 2A) that includes functionality for sequencing newly received messages and communicating such sequenced messages via data subsystem 204; the sequencer may be described as performing a "sequencing process," "sequencer process" or similar. In particular, a sequencer may be configured to sequence (e.g., with a logical sequence number and/or a timestamp) messages that have been received by the distributed transaction processing system 200. The sequenced messages may then be distributed to other components (such as matching engine 202 and/or processing instances 220) of the distributed transaction processing system 200 using the data subsystem. In some examples, a sequencer may be integrated into a matching engine such that newly received messages are sequenced by a sequencer and then, as appropriate, subjected to the processing performed by a matcher. In some examples, the distributed transaction processing system 200 may include a number of other matching engines (aside from matching engine 202), and a sequencer may be included within/integrated with one of those other matching engines that is separate from matching engine 202 as shown in FIG. 2A. In such instances, the matching engine 202 may receive/process messages that are sequenced and transmitted by the sequencer within one of those other matching engines.

In some examples, a sequencer may maintain a listing of currently pending data transaction requests of the distributed transaction processing system 200 within a locally maintained data store (e.g., stored in local memory to the computing device on which the sequencer is executing). This may allow the sequencer to keep track of the status of the submitted orders (even after they have been received and sequenced) and take action on such orders. For example, a cancelation request that is received by the sequencer for a given order may be acted upon immediately to cancel that order. Should any further action for that same order arrive at the sequencer after such cancelation (e.g., from other processing instances or client systems), the sequencer may cancel or ignore the command associated for that order as the order has already been canceled (e.g., it has been deleted). In certain examples, the locally maintained data store may include keeping track of the identifier for a given order, a number of shares associated with that order, whether the order is active, pending, or the like, a timer length, etc. Additional details of sequencing messages are provided in connection with, for example, U.S. Pat. Nos. 9,712,606 and 11,503,108, the entire contents of which each are hereby incorporated by reference.

Data subsystem 204 is a communication bus that provides for communication between the components and/or processes of the distributed transaction processing system 200. This may include communication between processes on the same computing device and/or different computing device.

Processing instance(s) 220 may be thought of as separate worker instances/processes, or the like that subscribe or receive data via the data subsystem 204. In some examples, processing instances 220 may directly receive data from outside sources. An example of this may be when order ports (which may be a type of processing instance(s) 220) receive data transaction requests from clients.

Each processing instance in the distributed transaction processing system 200 may be implemented via program logic (e.g., in the form of software code, firmware, and/or hardware) that is used to process data that is stored and/or accessible by the given processing instance. The data may be stored locally in connection with the respective processing instance. Data may also be received to/from processing instances 220 and/or transmitted onto the data subsystem 204 and/or to other external systems (e.g., client system 234, timer system 100, etc.). In some embodiments, two or more processing instances (e.g., one of which may be the matching engine 202) may be executed by the same computing node. In some embodiments, the two or more processing instances may be executed by the same processor or on the same core of a multi-core processor. In such cases, the processing instances may share the on-chip cache memory for faster processing.

Each of the various processing instances 220 may be implemented in different ways—e.g., to take into account design considerations of the distributed transaction processing system 200 and/or the task(s) a given processing instance is designed to perform. For example, in some embodiments, one or more processing instances may be implemented in the form of a software application (e.g., an .exe or a daemon computer process) that, when instantiated and executed, runs with its own computer process space using the underlying computing resources (e.g., processor(s), memories, and/or other hardware resources) of the distributed transaction processing system 200. Alternatively, or additionally, in some embodiments, different ones of the processing instances may be different threads or other sub-processes within a given computer process. In some embodiments, each, any, or all of the processing instances may be implemented by using a virtualized container or more full virtualized system. For example, each processing instance may be its own Docker container. Each virtual container may include the program logic that, when executed, carries out the tasks associated with that specific processing instance. Alternatively, or additionally, in some embodiments, each, any, or all of the processing instances may be implemented as field programmable gate arrays (FPGAs) or Application Specific Integrated Circuits (ASICs). Alternatively, or additionally, in some embodiments, a variety of the various approaches noted above for implementing these processing instances may be used; e.g., one processing instance may be implemented using a Docker container, another may be implemented as a software application that is running in a non-virtualized environment, and another may be implemented in the form of an FPGA. In some examples, each of the processing instances may be different worker agents within a cloud computing environment. Accordingly, the techniques herein may be flexibly employed depending on the needs of a particular implementation for a distributed transaction processing system and/or electronic trading platform.

Order ports 222 are configured to receive and process messages from, among other systems, client systems 234. Order ports may be arranged in a physical (e.g., a separate physical wire or the like) or logical manner (e.g., a separate TCP port or the like). Order ports may be responsible for performing initial validation of incoming messages and, as appropriate, annotating such incoming messages with additional values or fields. For example, a client ID may be appended to a newly received message that is received from a particular client system. Once new messages have been validated, they may be communicated to other components of the distributed transaction processing system 200 using the data subsystem 204. In some examples, the newly received messages may be communicated to a sequencer for sequencing, which will then communicate that message to all other components.

Data feed module 224 is responsible for processing messages communicated via the data subsystem 204 and generating a data stream 130 that provides updates to external systems (such as timer system 100) regarding state changes within the distributed transaction processing system 200. For example, matching an order may cause a state change in the order book associated with the ticker for that order. The data feed module 224 may communicate a message, as part of data stream 130, regarding this state change. A non-limiting example of such a data stream or data feed is the ITCH data feed.

As discussed herein, the amount of time that the distributed transaction processing system 200 "waits" to process submitted data transaction requests may be controlled based on a dynamically controlled timer value (e.g., a value for a duration of a timer). The timer value is dynamic in that some newly received data transaction requests may wait 10 ms in some circumstances and 5 ms in others (e.g., as a result of updates the duration for a timer).

In certain examples, the wait time may be applied to only certain types of messages (e.g., messages that specify as such). In other examples, the wait time may be applied to all newly received messages. In certain examples, the wait time is used to delay when newly received data transaction requests are processed in accordance with the processing provided by matcher 212. In certain examples, the holding or waiting functionality is provided or enabled by the pending list 216 and the timers 218 that are included with or associated with matching engine 202.

Pending list 216 is a data structure for holding newly received messages that are waiting or being delayed in accordance with certain example embodiments. For example, when a new data transaction request is received at matching engine 202 it may be placed into the pending list.

Each order in the pending list may have a status of active or passive (e.g., a status field of each order may be marked with a value associated with active or passive). Each of the active orders has a timer (e.g., as defined by timers 218) associated with them that is counting down.

When the timer for a given order expires or is up, the matching engine "moves" the order into the order book 214. More specifically, once the timer expires, the order may be applied or run through the matching process performed by the matcher 212 to determine if there are any contra-sided orders (e.g., contained in order book 214) that it matches against. In general, expiration of a timer for a given order may signal to the matcher 212 (or matching engine 202) that the state of the corresponding order has changed (or should change) and that further action should be taken—such as subjecting the order to the matching process performed by the matcher 212.

It will be appreciated that while an order is in a pending list that the matcher 212 may still operate to match other data transaction requests that are not subject to a corresponding timer (or have already been included into the order book). Accordingly, matching may not be performed for a given order by the matcher 212 until the timer for that given order expires. Further, while the timer is still counting down for that given order, the matcher may be active and executing the matching process for other orders. Additionally, while an order is contained in the pending list it is not able to match against other orders.

In some examples, orders that are submitted and to be processed in connection with the timer features herein may be required to meet some initial criteria or condition (e.g., a condition precedent) before a timer is activated and begins to count down for that order (e.g., before the order is set to active within the pending list). Orders that do not meet this initial condition may be stored into the pending list 216 (or other data structure) and marked as passive. Until this condition precedent is satisfied, the order may remain passive within the pending list and not have an activated timer that is counting down.

In some examples, the condition for activation of the timer may be based on a value or parameter that is specified in the data transaction request by the client system 234 (e.g., such as a limit price or value) or such a value or parameter that has been assigned by the distributed transaction processing system 200 (e.g., when received at order port 222). In some examples, satisfaction of the condition may be based on comparing a value that is specified in the data transaction request to one or more other dynamically changing values. The NBBO (or other value based on the NBBO) is an example of such a dynamically changing value. Accordingly, for example, a newly received data transaction request may include a defined value (e.g., a limit value) and only when this defined value crosses a midpoint of the NBBO will the timer for data transaction request be started for the duration that is currently set for that timer.

Once the timer for a given order is started, the duration that is set for that timer may be set based on the duration value for the ticker that is stored within timers 218. Timers 218 thus contains a list of timer values (or just a current timer value) for each ticker (e.g., hundreds or even thousands of different tickers) handled by matching engine 202 (e.g., stored to memory of the computing device 800 on which the matching engine 202 is operating). In some examples, timers 218 stores a per ticker timer parameter that holds the current duration value for the timer used for that ticker. Accordingly, in certain examples, the matching engine 202 may store hundreds of such timer values that are all being used concurrently for the different tickers and associated orders for such tickers. These timer parameters may then be updated, as discussed below, based on reception of new timer messages 203 (e.g., a timer update message) on a per ticker basis. Such messages may be received and processed during periods of operation for the distributed transaction processing system (e.g., without having to stop and reset a configuration file or the like). In certain examples, an operation period (or operational period) may be associated with a continuous period or other time frame during which match processing is performed by the distributed transaction processing system 200. Accordingly, an operational period may span longer than, for example, 930 am to 4 pm and indeed may include 24 hr/7 days of operation.

Accordingly, the timer parameters may be dynamically updated or dynamically adjustable during operation (i.e., in the middle of an operational period) based on reception of such timer messages 203. For example, the timer parameter for AAPL may have a duration value of 2 ms (e.g., how long the timer for AAPL will run for). In contrast, the timer parameter for IBM may have a duration value of 1.5 ms. As discussed herein, the duration of these parameters may change (e.g., tens, or even hundreds of times) over the course of a day (e.g., as they are updated by the timer system 100). It will also be appreciated that the number of updates to the timer parameters for the variety of tickers may cause each ticker to have a unique sequence of timer updates over the course of a day. It is also possible that the sequence of timer updates for some tickers may be the same.

Updating the timer in a dynamic manner may be performed based on the reception of the timer message 203 that is communicated from the timer system 100. The timer message may include a duration value and ticker for which the duration is to be applied. For example, the values for these two parameters may be 1.5 ms and AAPL for an example instance of the timer message 203. Such a message may be communicated once every 30 seconds (or other interval) and may be updated in predefined increments (e.g., 0.1 ms, 0.25 ms increments, etc.). In some examples, a single timer message 203 may include data for all of (or a plurality of) the tickers that are handled in the distributed transaction processing system 200. Over the course of an operational period (e.g., a trading day, such as 930 am to 4 pm, or other time period) of the distributed transaction processing system 200, hundreds of such update messages may be communicated. As one specific example, if updates occur once every 30 seconds between 930 am and 4 pm, then there may be 780 30-second time periods in which updates are performed. If the update rate from the timer system 100 is on 30 second interval, then some tickers may have as many as 500 updates to the duration of the timer for that ticker over the course of a day. Of course, other tickers may receive fewer changes to their duration (e.g., less 100, less than 50, or less than 25) as the number of updates may depend on particular environmental factors (e.g., such as liquidity) for that ticker on that particular day. As noted above, the determination of whether to increase, decrease, or leave the duration of the timer as is will be controlled based on the trained neural network of the timer system 100 and the data stream 130 that is provided to the timer system 100. As the duration for the timers for each individual ticker is updated over the course of a day, the resulting sequence of updates may be unique among the hundreds (or potentially thousands) of different timers that are being tracked.

In certain example embodiments, when each timer is activated for a given order, the time at which the corresponding timer will expire may be calculated. This calculated time may then be assigned to that order (e.g., as a value associated with the pending list 216). Subsequently, each processing loop of the matching engine 202 (or other computer process) may check if the current time is greater than or equal to that expiration time. If so, then the timer for that order may be determined to have expired. Accordingly, as used herein "activating," "starting," "triggering" (or similar terms) a timer may be, include, or involve determining the time that the timer will expire. This may be set by adding, for example, the currently set duration to the current time that is maintained by or based on, for example, a real-time clock (RTC) of computing device 800 or the like.

In some example embodiments, the functionality associated with the pending list 216, timers 218, and the like may be carried out by a processing instance that is separate from the matching engine 202. For example, a processing instance may store: 1) the current duration to be used for newly started timers; 2) a list of pending orders that have been received (e.g., via sequencer 210); 3) whether each of those orders meets any initial criteria; and 4) any timer data for such orders that have been activated (e.g., how much time is left for a given timer that has been activated for a given order).

Based on expiration of an active timer for a given order, the processing instance 220 may submit that order to the matching engine 202 for processing (e.g., to be processed by matcher 212).

In some examples, the processing instance(s) 220 may update a duration that is to be used for new timers based on messages received via data subsystem 204 (e.g., based on timer message 203). Such messages may be sequenced by the sequencer 212 or directly received from the timer system 100. In other words, rather than using a real-time clock of the computing device on which the processing instance (or matcher 202) is operating, the timer value may be based on a timestamp contained in a sequenced message or the like.

Alternatively, one or more processing instances may locally keep track of a timer, such by using a real time clock of the computing device 800 on which the processing instance is being executed.

In some examples, the dynamic nature of the duration for a timer may cause situations where a timer associated with a later received order is due to expire before the timer of an earlier received order. Accordingly, due to the changing duration for the different activated timers, a later received order could end up matching (e.g., included in a matching process) before an earlier received order. To address or prevent this type of circumstance, one or more solutions may be used to ensure that orders are communicated to the matching engine 202 in the order in which their timers where activated (e.g., regardless of when the timers for those orders expire).

In some examples, the pending list 216 may include a first in first out (FIFO) data structure to ensure that a first order for which a timer has activated is the first one removed from the data structure—even if the timer for a later entered order has already expired. In other words, once a timer is activated for an order it may be placed into a FIFO queue and only allowed to be removed from that queue if it was the first one placed into the queue.

To use an extreme example, suppose the duration that is controlled by the timer system 100 changes from 1 second to 5 ms. At the time of this change any order that has an active timer with 1 second (Order A in this example) may end up finishing after newly received order that have timers with a duration of 5 ms (Order B in this example). Accordingly, to address this issue, a FIFO queue may be employed to ensure that Order A, with the 1 second duration timer, is submitted to the matcher 212 for processing prior to Order B. In some examples, those orders with existing timers that are greater than a new timer may have their timers reduced to that time. Thus, for example, if a timer with an original duration of 1 second is remaining on order A, and the duration for a newly activated timer for Order B is 5 ms, the duration of the timer for Order A may be reduced to 5 ms. Thus, in certain examples, a timer that has been activated for a given order may have its duration or expiration time adjusted. This may be provided to ensure that orders are handled in priority order.

In certain examples, orders with expired timers may remain in the queue until older orders (e.g., those with longer duration timers that were already in the FIFO queue) have been de-queued. Thus, orders with expired timers may remain in the queue even if their timer has expired. In the above example, this may result in order B with a 5 ms duration timer remaining in the queue for 1 second before being de-queued after order A. With this approach, in certain examples, two conditions (being the oldest in the queue and having an expired timer) may be used to determine when an order is submitted to the matcher 212 for processing thereby.

Once a timer has expired (or the expiration time has passed as determined by the matching engine 202), an order is submitted to matcher 212 for match processing. This may involve comparing one or more data transaction requests (e.g., which may include those orders not subject to a timer and/or those that have already had their timer expire and are not in the order book) against one or more contra-side data transaction requests that are stored within order book 214 to determine if one or more (full or partial) matches can be made. Match processing may involve comparing an incoming data transaction request against contra-side data transaction requests that are resting in the order book 214 to determine if there is a match. In some instances (depending on the characteristics of the incoming data transaction request), if there is no match, then the matching engine 102 may store the incoming data transaction request in the order book data structure 124 on the side indicated by the incoming data transaction request (e.g., if it is "buy" order, then it will be placed on the "buy" side of the order book). Alternatively, or additionally, in some examples, match processing may involve only resting data transaction requests; this may occur, for example, if the match processing is triggered based on a change in market data (e.g., via incoming data feed 236) versus being triggered by an incoming data transaction request. In some embodiments, match processing may involve matching orders that are pegged (e.g., at a midpoint or some other value).

In some examples, orders that have been subject to the timer requirement are stored within a separate order book and handled by a separate matching engine and are not eligible to be matched against any order that has not be subjected to a timer. Accordingly, for example, orders for a given ticker may be associated with two separate order books 214 and/or matching engines (or matchers thereof). One order book may hold orders that have waited in accordance with a timer and another hold orders that have not been delayed by a timer.

Once the matching engine 202 takes an action (whether finding a match or not), the details of that action (e.g., an execution, an order entry, a cancelation, etc.) may be reported to other components of the distributed transaction processing system 200. This may include having the data feed module 224 read such messages from the data subsystem 204 and provided updates (via data stream 130) to timer system 100. As discussed elsewhere herein, this information may then be used to determine the state of the <state, action, reward, next state> tuple that is used to perform inference (as discussed in FIG. 1B) on the trained ML model that is stored in the timer system 100. Such data may also be used to further refine or retrain the ML model as discussed in connection with FIG. 3.

Additional details of transaction processing systems (e.g., exchanges, or exchange platforms, trading systems, and the like) are provided in U.S. Pat. Nos. 11,503,108 and 10,585,729, which are each entirely incorporated by reference herein.

Overview of FIGS. 3-5B; Reinforcement Learning

As described above in connection with FIGS. 1A-2, the timer system 100 may include a machine learning system 102 that includes a trained model 110, and the machine learning system 102 may produce timer values that are used by the transaction processing system 10 (in some embodiments, the distributed transaction processing system 200) for performing its processing. In some embodiments, the trained model 110 may be produced using reinforcement learning, as implemented in reinforcement learning system 20. FIG. 3A shows an example architecture for the reinforcement learning system 20, which operates on a ML model 314; FIGS. 4A-4B show a process that model training system 300 may use for training the ML model 314; and FIGS. 5A-5B show a simulation system 500 that is used to generate training data that is used for the training process of FIGS. 4A-4B for training the ML model 314.

Before further details regarding FIGS. 3A-5B are provided, information regarding reinforcement learning will be provided.

In certain examples, the techniques used herein relate to reinforcement learning, which is a domain of machine learning that seeks to train agents on how to take actions in a given environment to maximize a reward. This is achieved by having the agent take (initially) random actions and receive feedback (both positive and negative) on those actions. The feedback is provided in the form of a reward that allows the agent to, over time, refine its approach in the actions it takes based on the state of the environment that it sees.

Further details of certain aspects related to deep reinforcement learning are provided in Playing Atari with Deep Reinforcement Learning by Mnih et al, 2013 and Deep Reinforcement Learning with Double Q-learning by van Hassett et al, 2015.

A generic single iteration of a reinforcement learning process (loop) is known as an episode. For each episode, the agent takes an action and receives feedback from an environment in the form of both a reward and the next state from which it can take another action. Each time around the loop a <state, action, reward, next state> tuple (also called an experience herein) is generated. These tuples are stored into a memory buffer and are then accessed for training & updating the weights of a deep neural network.

The reward in reinforcement learning may be expressed as reward function and is used to provide a score a given state-action pair (or a given state). It is used to quantify the desirability of a given state for the agent as part of the machine learning process. The reward function that is used can vary (perhaps significantly) based on the overall goals of the model. For example, if the goal was to train a model to travel (e.g., by car) between points A and B, a reward function that rewarded lower accidents would result in a different model than one that rewarded the time taken to travel between points A and B.

One challenge with deep reinforcement learning techniques is that they necessarily require an environment, such as the Atari 2600 games from Mnih et al, in order to provide the feedback loop necessary to even begin at attempting to train a model that can be useful. Indeed, as noted above, the training process for reinforcement learning starts off randomly before converging. While developing such an environment for 40-year-old video games is possible as shown in Mnih et al, it can be more problematic when the target environment is more complex. For example, in cases where the environment is difficult to simulate due to the real-world interactions performed by users—as is the case of automated trading platforms that process billions of transactions per day. Allowing a reinforcement learning system to train on these types of environments can be problematic as the initial training process would disrupt the normal functioning of that environment (perhaps detrimentally so).

Referring to FIGS. 3A-5B, the simulation system 500 of FIG. 5A may be used to perform reinforcement learning in a simulated environment (so as not to disrupt the "production" environment of, for example, the distributed transaction processing system 200); more particularly, the simulation system 500 may be used to generate training data for use by model training system 300, for the performance of a reinforcement learning process (such as the process of FIG. 4A-4B) that involves exploring and learning from success and failure. This simulation system 500 is designed to allow the training of a model (ML model 314) to progress to a state where, as noted, it can be deployed in connection with the distributed transaction processing system 200.

In connection with the technical domain of assessing dynamic timer values, the training process that is employed in certain example embodiments operates by having an agent (which may be part of the model training system 300) select a relative timer change (or an absolute value for the timer delay). This is the "action" within the reinforcement learning process. This action, in combination with the state (which may be represented as a vector in n-dimensional space—with n being the number of features for which the model is being trained on) is then simulated within the simulation system 500 in order to determine both the next state and the reward value for that action, with that state transition (e.g., the state change between the initial state and next state). In certain example embodiments, the next state may be provided by the relevant historical and/or responsive features returned from the environment with the reward calculated as a function of one or more variables that are produced or associated with the environment.

In the context of electronic trading platforms, such as distributed transaction processing system 200, two variables (goals) were identified that can be used to train a model towards a goal (e.g., to be used in a reward function). Decreased markout and increased fill rates.

Markout may be calculated as a function of the magnitude and/or direction of a market move after a trade occurs. Accordingly, a function for markout may be:

$$MO_{\delta,bps,trade} \begin{cases} MO_{\delta,bps,tradesell} = \left| \frac{(100)*(100)(M_t - M_{t+\delta})}{M_{t+\delta}} \right| \\ MO_{\delta,bps,tradebuy} = \left| \frac{-(100)*(100)(M_t - M_{t+\delta})}{M_{t+\delta}} \right| \end{cases}$$

With $M_t$ being the midpoint of the NBBO at t and $\delta$ being a given time horizon. While different time horizons may be used, a time horizon of 1 second has shown to give good results in certain example embodiments. Note that bps refers to basis points (bps) and thus the reward (discussed below) may be thought of as rewarding decreased markout at 1 second into the future. It will be appreciated that similar formulas may yield similar results—e.g., due to the nature of how deep neural networks are trained.

The other reward component identified was fill rate. Fill rate may be the percentage of orders that are able to be met without running out of quantity of a stock at any given time. One way to define fill rate may be:

$$FR_{period} = \frac{\text{shares traded}}{\text{total eligible shares in period}}$$

The above formula for fill rate is an example, and different fill rate calculations can be used (e.g., fulfillment*hit rate, etc.).

Given the above quantitative values that are calculable, the reward function that is used in connection with a reinforcement learning process may be as follows:

$$Reward_{step} = \frac{\lambda}{\sum q_i} \sum_{i=1}^{T} q_i(MO_{\delta,agent,bps} - MO_{\delta,synthetic@10,bps}) + (1-\lambda)(FR_{agent} - FR_{sim@10})$$

With $q_i$ being the shares traded for trade i and T being the total number of trades in a period with $\lambda$ representing a scaling factor between the different components (markout and fill rate) of the reward function. In some examples, $=$ may be set to 1 to thus zero out the fill rate reward component of the reward function. This reward function, in combination with the state data and the given action that is chosen, facilitates training a model that will converge to output signals that represent timer values that maximize the defined reward (e.g., increasing fill rate or decreasing markout). While the above reward function has provided acceptable results in training, other reward functions are also possible without departing from the scope of the disclosed subject matter.

The model training system 300 and the simulation system 500 make use of the above values and calculations in order to both generate training data for a model and to train the neural network that will be trained and deployed to timer system 100, for which the outputs thereof can then be used by distributed transaction processing system 200. Once a trained model is deployed (e.g., with its weights frozen), and its output used in conjunction with distributed transaction processing system 200, the transaction data that is produced in connection with processing that is performed by the distributed transaction processing system 200 may be used to either retrain or update the previously trained model.

Description of FIGS. 3-4B

FIG. 3 shows an example reinforcement learning system 20 that generates a trained ML model 110 that is used by the timer system 100 in FIG. 1B according to some embodiments. FIG. 4A is a flow chart view of how an example ML model may be trained using a double deep Q-network training process, which uses a main neural network 420 and a target neural network 440, to generate the trained ML model 110. FIG. 4B is a flow chart view of a training loop that is part of the training process of FIG. 4A and is used to update the weights of main neural network 420.

As discussed herein, training a model using reinforcement learning can use positive (and negative) feedback in connection with the action taken and the calculated reward. When the environment on which a model is being trained cannot handle the initial stages of training (e.g., because such training is random), then a simulated environment can be used to provide the training data. Further discussion of how simulated data (sim data 306) is generated for training a model is provided in connection with FIGS. 5A-5B. Once a model is trained and used in a production environment, such as distributed transaction processing system 200, then the data (from data stream 130) from that environment may be used to train (or update/retrain) a model.

The model training system 300 includes two modules, generate training data module 304 and model training module 304.

The generate training data module 304 is used to gather experiences, each of which are tuples 312 of <state, action, reward, next state> and store them to episode database 310 (which may also be referred to as a memory buffer, buffer, distributed database, or database herein). Each episode (e.g., which may be 1 day) within the data can include hundreds or thousands of different periods. For example, 1 episode may include 780 periods (780 different individual experiences), each of which corresponds to separate 30 second periods over a given trading day in which the distributed transaction processing system 200 operates. Of course, other periods or period lengths are also possible depending on the particular application need and model that is being trained.

In connection with certain example embodiments, it was determined during that a 30 second time period provided an acceptable tradeoff between effective updates (how often the timer could be updated) with the physical latency barriers associated with receiving data from distributed transaction processing system 200, processing such data, and providing a responsive timer adjustment. However, should communication and processing speed increase (e.g., such that sub-1 nanosecond latency is possible), then it may be more accurate to adjust the timer length in connection with data associated with every newly received data transaction request message (or a quicker update tick rate) that is to be processed by the distributed transaction processing system 200. It was also determined that quicker updates may, in certain instances, result in a model that is more brittle (e.g., it would be more difficult to generalize) if it was based on a per-order view of the distributed transaction processing system 200. Accordingly, update periods between 10 seconds and 1 minute (e.g., 10, 15, 20, 25, or 30 seconds) may provide beneficial returns considering physical processing and communication limitations.

In some example embodiments, when model 110 is being initially trained the <state and next state> values may be determined based on sim data 306 provided by the simulation system 500, with the reward calculated based on the resulting data from the simulation system 500, and the action (timer value 305) determined based on the output from the ML model that is being trained. Initially, the actions may be selected randomly (or semi-random) until the neural network of the ML model 314 has had a chance to "learn" (by having the weights thereon updated). In other words, the search space that is explored in selecting actions may be gradually narrowed down as the model converges towards a state that optimizes towards the defined reward.

After a ML model is trained into trained ML model 110, further training (either in the form of transfer learning and/or complete retraining) may be based on data stream 130 that is produced by the distributed transaction system 200. In this case, the state and next state values are derived from the underlying data of the distributed transaction processing system 200 (e.g., represented as a vector into n-feature space), the action is the selected timer for that time period (e.g., produced by timer system 100 and used distributed transaction processing system 200), and the reward is the calculated based as discussed above (e.g., to determine markout and/or fill rate).

The other component of the model training system 300 is the model training module 302 that pulls (e.g., samples) batches of experiences from the episode database 310 and performs the training process for the deep neural network— ML Model 314, which includes main neural network 420 and target neural network 440.

As discussed herein, reinforcement learning, especially deep reinforcement learning, can involve having an agent decide what action to take given a state (e.g., at time t). In certain examples, training a model using this approach can use Q-values, which is a technique for discovering an optimal policy that seeks to maximize the state-action value that relates to the Q-values. The Q-value of a given action-state may be expressed as:

$$Q(S_t, A_t) = \sum_{t'=t}^{T} E\left[ \gamma^{t'-t} R(S_{t'}, A_{t'}) \mid S_t, A_t \right]$$

With gamma being the discount factor and R being the reward. The optimal Q may then be found via the Bellman Equation, which is expressed as:

$$Q^*(S_t, A_t) = E\left[ R_t + \gamma \max_{A_{t+1}} Q^*(S_{t+1}, A_{t+1}) \mid S_t, A_t \right]$$

During the training process performed by the model training module 302, as illustrated in the flow chart of FIG. 4B, the episode database 310 is sampled and the target Q-values are calculated via the above equations. From those Q-values, loss values are calculated (e.g., the MSE error in the Bellman Equation using target values from previous iterations), and the weights of a neural network can be updated via gradient descent based on the calculated loss.

In certain example embodiments, a double deep Q-Network (DDQN) training process can be used to train ML model 314.

As shown in FIG. 4A, the DDQN training process involves using two neural networks, a main neural network 420 and a target neural network 440, which are sometimes collectively referred to as ML model 314. A difference between the target and main neural networks is that the target neural network 440 is updated more slowly than the main neural network.

The DDQN training process shown in FIG. 4A starts with gathering, at 402, data (e.g., tuples 310 as discussed herein) that is stored into episode database 310.

In some embodiments, the generation and storage of data at 402 for n episodes (e.g., where n is equal to the number of tickers for which data is being gathered) may be handled concurrently/in parallel for all episodes rather than sequentially. In certain example embodiments, this may be performed by, for example, starting multiple working instances that each write to a common data store (episode database) that is used as a memory buffer. In certain example embodiments, the parallelization of the gather/store process can be facilitated by using a distributed database as the memory buffer in order to allow for substantially concurrent writing of the data to the buffer that is used as part of the training process. For example, the worker instances may be started within a cloud-based computing environment that all write to a common distributed database (e.g., that exists across multiple physical computing devices).

In some examples, when the tuples are being generated, the reward value of the reward function may be 0. In cases where the reward is calculated to be zero, the tuple may be discarded and not written to memory buffer. In other words, only tuples with non-zero reward values (e.g., defined via reward function discussed herein) may be added to the buffer. Accordingly, only those tuples with a non-zero fill rate and/or markout value may be added to the buffer. This approach can increase the relevance of the data that is being used in the reinforcement learning process.

In certain examples, multiple different buffers (e.g., multiple instances of a memory buffer or episode database 310) can be used to store episodes that are associated with each of the individual components that makeup the reward function that is used as part of the reinforcement learning. Thus, for example, different memory buffers (e.g., a first memory buffer, a second memory buffer, etc.) may be used to store non-zero markout and fill rate results of the above noted reward function. When multiple buffers are used, the sampling process (at 454 in FIG. 4B) may sample from each buffer an equal weighted (or non-equal weighted) number of times.

In certain examples, the buffer may be set at a certain size and the training data stored to the buffer may remain in the buffer until being overwritten by newer episodes. This allows for episodes associated with day i to be contained within the buffer along with data for episodes i+1 when the buffer is sampled.

Once the episodes for a given day have been stored into the buffer at 402 (e.g., as performed by the generate training data module 304), then the training loop for the loaded episode data may be performed at 410.

The training loop performed in some embodiments at 410 in FIG. 4A is set forth below, in pseudo code form in Table 1, and is also shown in FIG. 4B.

Referring now to FIG. 4B, the training loop depicted in FIG. 4B iterates over training data that is stored in a memory buffer (e.g., episode database 310). The number of iterations (m) may be set at, or below, the number of tickers for which there are episodes. However, different sampling amounts are also contemplated that may use either less than (or potentially greater than) the total number of symbols for which data has been added to the memory buffer 404.

At 454, a first iteration of the loop proceeds with the first of m sampling iterations.

At 454, a sample batch is retrieved from the episode database 310. It should be noted that the sampling that is performed may be across the whole of the buffer and may be performed with replacement. As noted above, the buffer may contain episodes that are associated with different days (e.g., if the gather and store process did not overwrite all data from a previous day). In any event, the batch size that is sampled from the buffer may be a couple dozen tuples or between, for example 10 and 25 tuples for a given batch.

Then, at 456, for each tuple in the batch that has been sampled, a target Q-value is calculated at 456. From these Q-values for this batch, a loss value is calculated at 458 that is then used to update the weights of the main neural network 420 at 460.

At 462, if there are additional batches to process, then the process returns to 454 with another batch being sampled from the buffer.

Once the number of batches that have been sampled reaches m, the training loop ends and returns to 420 in FIG. 4A.

At 420 in FIG. 4A, the weights and parameters of the target neural network 440 are updated based on a combination of a prior version of the target neural network 440 and the most recently updated version of main neural network 420. It will be appreciated that the two may be substantially different due to the potentially hundreds of updates (e.g., where the number of updates can be m as shown in FIG. 4B) performed to the weights of the main neural network during the training process 410.

The process shown in FIG. 4A repeats for a number (d) of days with new tuples being generated and/or gathered for each iteration of 402, the subsequent training that occurs as discussed above.

Using this approach, the weights of the target neural network 440 are updated less frequently than those of the main neural network 420. This approach can provide additional stability for the resulting model as weight updates occur less frequently and/or with less severity. For example, the parameters of the target model 440 will tend, in comparison to the parameters of the main model 420, to not be as over-adapted to one set of experiences. This can result in the target neural network 440 being more stable than the main neural network 420, which is being adapted for each set of sampled experiences. The updates to the target model can be handled as a function of a weighted average of the parameters of the main model and the existing target model. In certain examples, the weighted average may be equal between the old target model and the recently updated main neural network. This approach can work to cause a more stable middle ground for training the ML model that produces trained.

In certain examples, the training performed by the model training system 300 divides the historical data into discrete days, which are further broken down into 30-second steps. In certain examples, there are then 780 30 second periods for which data is gathered for each ticker symbol for each day. Accordingly, the entire training loop may be a function of the number of trading days, the number of symbols, and the number of 30 second (or other length) periods during a day. In the case of a 30 second period this may be 780, which is the number of 30 second periods between 930 am and 4 pm (e.g., the time period in which the distributed transaction processing system 200 operates to match data transaction requests). It will be appreciated, however, that other time periods and the like may be considered to achieve results based on different application needs. For example, the trading day may be broken into 15-second increments. This would double the number of episodes but may provide higher fidelity into the action-state value of the environment.

Accordingly, for the above example, the number of episodes that are used in the training process may be equal to the number of symbols*780. The number of episodes may then be further multiplied by the number of days over which training is performed. In certain examples, the number of days of different data may be greater than 10 and between 20 and 100. For example, the number of days may be about one-quarter's worth of trading days during a year. As noted herein, the number of symbols may be in the 10 s, hundreds, or potentially thousands.

Pseudo-code for the training process discussed above and shown in FIGS. 4A and 4B, and that is performed by the model training system 300, is provided below in Table 1.

TABLE 1 for date d in {date, end date} do
    Agent Collection - Generate Training Data Module 304
    for symbol s in {symbols} do for iteration I in $780 \times \frac{30 \text{ second periods}}{1 \text{ day}}$ do Gather and store (state, action, reward, next state)
        experiences
        end for
    end for
    Training Loop - Model Training Module 302
    for m in number of symbols do
        Sample a batch of (state, action, reward, next state)
        experiences for experience e in {batch} do
            generate target Q-values
        end for
        Calculate loss L
        Update Main model parameters via gradient descent TABLE 1-continued

```
        end for
        Update target weights to be evolving weighted linear
        combination of main model and target model weights
end for
```

It will be appreciated that the above discussed training process may operate based on simulation data 306, the data from data stream 130, and/or a combination thereof. In certain examples, the trained ML model 114 may be completely retrained on a monthly or quarterly basis. In certain example embodiments, weight-freezing can be used in connection retraining. In certain example embodiments, transfer learning techniques may be applied that, for example, freeze all but the last layer of the neural network. The last layer of the neural network may have the parameters and/or weights thereof updated based on the above discussed training processes. Such partial updates of the layers of trained neural network may be performed on a daily or weekly basis and therefore allow the trained ML model to stay up-to-date and act on new data that is provided by the distributed transaction processing system 200.

Description of FIG. 5A-5B

FIG. 5A is a diagram of a simulation system 500 that is used to generate training data as part of the reinforcement learning system shown in FIG. 3 according to certain example embodiments. And FIG. 5B graphically illustrates how the simulation system of FIG. 5A models the generation of simulated data transaction requests according to certain example embodiments.

The goal of the simulation system 500 is to generate data (sim data 306) that is similar to that which would be generated by distributed transaction processing system 200. Accordingly, the simulation system 500 models, via a simulated matching engine 506, the matching engine 202 (or the matcher 212) that is part of the distributed transaction processing system 200. This simulation is run based on historical transaction data 502 gathered from the distributed transaction processing system 200. This data is composed of transaction data that was obtained when a static timer value was used for delaying how data transaction requests are processed by the matcher of the distributed transaction processing system 200.

The simulated matching engine 506 is designed to accept orders, cancelations, and replacements and includes similar functionality for matching such orders of the same symbol at the same price. Also included in the simulated matching engine 506 is timer functionality that delays when newly received orders are processed by the match process thereof. This is illustratively shown in FIG. 5B. In the case of the simulation system 500, the timer value 510 is provided from the agent that is part of the model training system 300 of the reinforcement learning process.

The historical transaction data 502 is modified to account for changes in behavior that may occur with modified timer values that are provided via the agent of the model training system 300. In other words, changing the timer 550 from (for example) 25 ms to 10 ms (or vice versa), would have resulted in some non-zero change to the environment over the historical performance that is represented in the historical transaction data 502.

Such changes are notable in that changes in timer length may result in changes in cancelation behavior. To account for such cancelations, cancelation module 504 is used to apply a statistical model when timers, other than the timer value that was used for the historical data, are used by the simulated matching engine 506.

In certain examples, the cancelation module 504 operates by modifying the historical transaction data 502 as follows. For each order in the historical data 502 that was not canceled two determinations are made. A first determination is made whether a given order would have been canceled and a second determination is made when that given order would have been canceled. The first determination is performed by sampling from a binomial distribution to determine whether or not a given order would have a chance of canceling.

In certain examples, the binomial distribution for this first determination was fit using the likelihood of a participant canceling for each specific symbol at a given time of day. If the participant in question did not historically trade that symbol at that time of day, the participant's overall probability of canceling for that symbol in general may be used. If the participant had never historically canceled a given symbol, then a generic probability for that participant to cancel in general may be used.

If the results of the binomial determination are favorable for cancelation (e.g., the order will be canceled), then a time interval is sampled between when the order was placed and when the cancelation would occur using an exponential distribution. In a manner similar to the first determination, the parameters of this exponential distribution for the second determination may be fit from past participant historical cancelation behavior for that symbol at that time of day. Similar to the above, any missing data for a given participant/order may be filled in first by the participant for that symbol, and then for that participant in general.

With the above modification of the historical transaction data, the modified transaction data is then applied to the simulated matching engine 506 that produces sim data 306. This data is then used to form the environment state for the machine learning process that is discussed in connection with FIG. 3.

FIG. 5B provides a graphical illustration for how the simulation of the handling of the orders is handled by the simulation system 500 (e.g., in connection simulated matching engine 506). As shown, those orders that are not yet eligible for timer activation may be canceled. Once a timer 550 is activated, the others may also be canceled. Once the timer for the provided timer duration expires, then the matching engines tests if there is a match, if not, then the order may be placed in an order book. At this point there is yet another possibly of cancelation of the order. Of course, if an order matches fully, then it cannot be canceled, thus even if an order were indicated as having a possibility of canceling it may not end up canceling due to being matched.

In any event, the sim data 306 produced by this simulation system may be used in the reinforcement learning process to allow the agent that is controlling the learning process to learn what timer durations to use and what durations not to use.

Description of FIGS. 6-7B

FIG. 6 is a diagram of the stability protection system 600 that is shown in FIG. 1B according to some embodiments. FIG. 7 is a chart that illustrates the relationship between timer length, a determined volatility threshold, and a rolling volatility value according to certain example embodiments. FIG. 7B illustrates the different values that may be used to dynamically control the timer used by the distributed transaction processing system 200.

In certain instances, volatility of a given environment may change relatively quickly and be unstable. In examples involving data such as NBBO values, this volatility may be based on the NBBO value for a given symbol. In such instances, the machine learning system 102 of the timer system 100 may not satisfy one or more constraints. Accordingly, the stability protection system 600 executes a stability process 126 to determine when instability is greater than a determined threshold (which may be change hourly, daily, weekly, or by some other metric). When the threshold is reached, the duration for the timer used by the distributed transaction processing system 200 is changed to default timer value 128.

In general, the default timer value 128 may be outside or greater than a range allowed by the timer system 100. Thus, for example, if a set range of allowed dynamic timer values 114 is between 0.5 ms and 2.5 ms, with 0.25 ms changes, then the default timer value may be 2×, 5×, or 10× that amount. For example, a 10 or 12 ms timer may be used in some examples. In other instances, the default timer value may be set to the maximum of the allowable range (e.g., between 0.5 ms and 2.5 ms in the above example). In some examples, the value used for the default timer may be the maximum value (e.g., a maximum threshold value) that may be assigned to a timer during a given day. Such a value may be used in some examples to slow down the speed at which data transaction requests are processed by using the matcher.

In any event, the stability protection system 104 operates by setting a threshold 620. The threshold 620 is calculated and set based on historical data 608 that is obtained or otherwise stored in connection with the stability protection system 104 and may be, for example, the historical values for the NBBO over 1 or more days for each ticker symbol. The threshold 620 is determined on a periodic basis (e.g., daily) at 610. Threshold 620 may be referred to herein as a stability threshold or a volatility threshold.

Different techniques for determining the threshold can be used. In some examples, the number of times the NBBO changes in some period may be used to determine if it is volatile or not. In certain examples, the threshold for a symbol may be calculated as the difference between the highest and the lowest NBBO midpoint values for the symbol from a prior trading day (e.g., operational period) such that, if applied to trading activity during the prior trading day, it would have caused a determination that about one percent (e.g., within a standard deviation thereof) of that operational period is unstable.

In certain example embodiments, a bisectional method may be used to determine a threshold in which some given percentage of a tracked historical value (e.g., the NBBO) is considered unstable. For example, the bisectional method can be used to find the threshold such that 1%, 2%, 5%, or 20% (or any value below, in between, or above such values) of the prior days NBBO value would be considered unstable. This approach may be advantageous as it allows for potentially wider leeway in how the timer system 100 operates to provided timers to the distributed transaction processing system 200. The pseudo-code for this threshold determination process may be as follows:

TABLE 2

Define Coverage (e.g., % of coverage that is unstable)
Define Small Threshold (small value)

TABLE 2-continued

Define Large Threshold (larger value)
While the Midpoint between the Small Threshold and Large Threshold does not offer Coverage:
{
  Update Small Threshold Or Large Threshold to be the Midpoint according to what direction offers best coverage with respect to the midpoint
  Update Midpoint to be halfway between Updated small/Large Threshold
}
Return midpoint as optimal threshold It will be appreciated that other algorithms that accomplish similar goals (e.g., in setting the threshold based on deeming a percentage of instability from a prior time period) may be used in certain examples. In some examples, the threshold 620 may be calculated prior to the start of a trading day or the like (e.g., prior to 930 am) and be used throughout the day for a given ticker.

The techniques herein allow for each symbol to have its own threshold value that may more appropriately fit the activity profile of that ticker. Accordingly, for example, if there are 1000 ticker symbols, then there would be 1000 calculations of a threshold and potentially as many different thresholds that the stability protection system 600 would keep track of during the day.

Once the threshold 620 value is determined, then the stability protection system 600 may calculate when the NBBO (or other data associated with a ticker) has become unstable.

Calculation of a rolling stability metric for a given ticker symbol can occur by having the stability protection system 600 obtain or receive a data stream (e.g., of NBBO values) for the ticker symbol(s) and storing such data into a rolling buffer 620. The NBBO value (or a value that is based on the NBBO, such as the midpoint of the NBBO) for a given ticker may be referred to herein as a dynamically changing value. In some examples, the data stream that is received may be the same or a subset of (e.g., just the NBBO values) as the data stream received by the machine learning system 102. In some examples, the buffer may hold the last 3 seconds, or 5 seconds, of data updates from the data stream. In certain examples, the buffer may be designed to hold the last 1 to 10 seconds of data. Then every 1 second a volatility metric may be calculated from that rolling buffer at 622. In some examples, the update rate for the volatility metric may be about 1 second (e.g., +/−0.5 seconds). In some examples, the volatility metric may be updated between every 0.5 seconds and 5 seconds or between 1 and 2 seconds. In some examples, the volatility metric may be updated or calculated at 622 every time there is an update (a change) to the dynamically changing value for that ticker. Other update rates are also possible depending on the nature of the data being examined, the processing resources employed to determine the volatility metric, and/or the communication latency between the distributed transaction processing system 200 and the timer system.

In any event, if the volatility metric is greater than the volatility threshold 624, then the default timer 128 is triggered and communicated to the distributed transaction processing system 200. In certain example embodiments, the NBBO (or other target metric as needed) may be considered unstable based on: 1) the number of NBBO updates over the last defined length of time (e.g., the length of the buffer, such as 1 second, 2 second, 3 seconds, etc.); 2) the standard deviation of the NBBO over the last defined length of time; and/or 3) a range of NBBO values over the buffer time period. If any or all of these exceed a defined stability threshold, then the volatility metric may indicate volatility and trigger the default timer. In some examples, the instability determination for a given symbol may be based on evaluating the difference between the highest and the lowest NBBO midpoint values over the last three seconds (or other period of the buffer). This difference is then compared to a threshold value for the symbol.

The aspects associated with the steps described above are also illustrated in FIG. 7A, with a calculated threshold value of 702, and the calculated volatility of the NBBO at 704 being shown. The resulting timer length used during those periods is shown as line 700. As shown, upon the volatility of the NBBO exceeding the threshold at timer periods 704, the timer length jumps to 12 ms, which is an example of a default timer value that can be used by the stability protection system 600 according to certain example embodiments.

In certain examples, once a default timer value has been triggered, the distributed transaction processing system 200 may keep the timer at that default value for a given length of time, such as 0.5 seconds, 0.75 seconds, 1 second, 5 seconds, etc. In some instances, the default timer may be triggered on multiple successive instances (e.g., if the NBBO continues to be unstable). Thus, for example, a longer period of instability is shown in FIG. 7A (e.g., over 20 seconds or so. In some examples, the timer system 100 may only send a new update of the timer when the instability in the tracked value returns to a more acceptable level (e.g., under the stability threshold). Thus, there may be a period where a default timer is triggered and there are no changes to the duration of a given timer for 1 minute or more.

In some examples, once instability is detected or triggered, then the system revaluates the instability metric every time the NBBO for that ticker is updated (e.g., as supplied via data stream 130). Accordingly, for example, when the stability determination is positive (from 624) each further update to the rolling buffer 620 (e.g., with new NBBO data) will cause a further determination of the volatility metric. If the instability continues, then the period used for instability (e.g., 0.5 seconds, 0.75 seconds, or the like) will be reset such that the default timer value continues to be used.

In some examples, the default timer value may be set to expire after a set time period. Accordingly, upon expiration, the prior (non-default) timer value may be communicated to the distributed transaction processing system 200. In some examples, the timer system 100 may continue to determine dynamic timer values based on the changes in the data stream (by using the ML model). Then, upon expiration of the default timer value, the distributed transaction processing system 200 may use the most recent dynamic timer value that it has determined. In some examples, the distributed transaction processing system 200 may continue to receive updates from the timer system 100 on incremental changes to the dynamic timer value while the default timer is active. Based on such updates, the distributed transaction processing system 200 may keep up to date with how the timer system has changed the ML timer. In other examples, the timer system 100 only sends a message for a timer to the distributed transaction processing system 200. With this type of implementation the expiration of the default timer may be maintained by the timer system and the resumption to the dynamic timer value may be controlled by the timer system 100.

In still other examples, once the default timer value expires a second default timer length may be used (e.g., similar to the length that is used when the trading day opens—1.25 ms), which may be at a midpoint between the upper and lower bound of the timer ranges that are valid for a dynamic timer value. In other words, the timer system may reset the timer value, which may then start the dynamic process that is controlled by the timer system 100 again.

FIG. 7B illustrates an example relationship between the default timer value 128 that is produced by the stability protection system 600, the dynamic timer value 114 that is produced by the machine learning system 102 and the timer value that is communicated (via timer message 203) from the timer system 100 to the distributed transaction processing system 200. In the example illustrated in FIG. 7B, the stability protection system 600 activates from 9:30:29 to 9:30:31 (2 seconds).

Upon activation (at 9:30:29) a timer message is communicated with the default timer value. Subsequently, the stability process continues to indicate violation of the stability threshold until 9:30:31 when the volatility metric is measured to be below the threshold. At this time, a hold period of 750 ms is begun. After this hold of period, the timer system 100 then resumes using the dynamic timer value produced by the machine learning system 102. Note that during the period of instability, the machine learning system 102 continues to process and determine dynamic timer values and thus when the period of instability passes, the newly calculated dynamic timer value (calculated at 9:30:30) is communicated to the distributed transaction processing system 200.

Accordingly, the stability protection system 600 and the machine learning system 102 may operate concurrently or in parallel, with the default timer value superseding or replacing the timer value from the machine learning system 102 during period of detected instability.

Description of FIG. 2B (Illustrative Example)

FIG. 2B is a sequence diagram showing an example implementation of how timer values on the distributed transaction processing system of FIG. 2A may be updated according to some embodiments.

This sequence diagram involves client system(s) 234, distributed transaction processing system 200 and matching engine 202, timer system 100 with machine learning system 102 and stability system 600, and external systems 134. The sequence shown in FIG. 2B illustrates various aspects of the example embodiments described herein and discussed in connection with an example ticker "ABCXYZ."

At 248, a data stream is shown as being communicated between the distributed transaction processing system 200 and timer system 100. This is used to illustrate the continuous data stream provided to the timer system 100 from the transaction processing system 200. As noted herein, messages may be communicated when there is a change in the state of the distributed transaction processing system 200 (e.g., a new order is processed, an order is matched, an order is canceled, an order is modified, etc.). Accordingly, many such messages may be communicated in the sequence that is shown in FIG. 2B.

At 250, timer system 100 performs a dynamic timer calculation by using machine learning system 102 and determines a dynamic timer value of 2 ms for ticker ABCXYZ. This process is based on the data stream that is provided from the distributed transaction processing system 200.

At 252, the timer system 100 generates and communicates a timer message to the distributed transaction processing system 200 that includes a timer value of 2 ms for ticker ABCXYZ.

At 254, the duration for timers for A is updated. For example, the duration value in timers 218 for ABCXYZ is updated to 2 ms.

At 256, one of the client systems 234 submits a new data transaction request A. As discussed herein, this data transaction request may be processed by order port 222 that is associated with the client that submitted the data transaction request. The data subsystem 204 is used to communicate A to matching engine 202.

At 258, the matching engine 202 receives A, looks up the current duration value for timers and starts a timer of 2 ms for A. As noted herein, this may involve calculating a time at which the timer will expire (e.g., current time+duration) and assigning that value to the order for which the timer is active (e.g., as an expiration time). It will be appreciated, as discussed elsewhere herein, that one or more conditions may be required for activation of a timer (e.g., that the limit value of the data transaction request is at or better than the NBBO).

The timer then runs for 2 ms. During this 2 ms period the matching engine 202 may perform additional or other processing—e.g., matching other orders for ticker ABCXYZ, or other orders for other tickers. In some examples, the matching engine may continually check if the expiration time for any orders with active timers have passed. In other words, the matching engine 202 may run in a continuous loop (e.g., operating at thousands or millions of iterations over 1 ms) and continually check if the timer for each timed order has expired.

At 260, the matching engine 202 determines that the timer for data transaction request A has expired and then executes the matching process for data transaction request A (e.g., against other orders for ticker ABCXYZ). In some examples, this may result in determination of a match (e.g., a trade execution). In other examples, data transaction request A may be stored to order book 214.

At 262, a message with an update to the NBBO for ticker ABCXYZ is received by distributed transaction processing system 200. Based on reception of this NBBO update, the order book 214 may be updated at 264. This is because the orders placed into the order book may be assigned to track the midpoint price of the NBBO. This may subsequently result in some orders becoming ineligible (e.g., because their limit value makes them now non-marketable) and/or other orders in the order book to become eligible. Accordingly, in conjunction with the update to the order book at 264, the match process 212 of the matching engine 202 may be performed on the orders within the order book to determine if there are any matches based on this updated NBBO value. As discussed herein, such an NBBO update may also trigger the activation of a timer for one or more orders that have not already had their timers activated (e.g., those on the pending list).

The NBBO update at 262 is also received by the timer system 100 and particularly the stability protection system 600 that may be tracking the NBBO for ticker ABCXYZ. In this case, at 266, the stability protection system 600 determines that the NBBO for ticker ABCXYZ has exceeded its volatility threshold. This causes the timer system 100 to communicate the default timer value (12*ms*) at 268 to the distributed transaction processing system 200. In some examples this value is referred to as a static timer or a superseding static timer that is used to replace or supersede the dynamic timer produced by the machine learning system 102.

At 270, the 12 ms timer value at 268 is received by the matching engine 202, which then updates the duration value (in timers 218) for ticker ABCXYZ.

At 272, another data transaction requests "B" is communicated to distributed transaction processing system 200. This data transaction request is provided in manner similar to A, except this time the timer is set at 274, to 12 ms for data transaction request B (instead of 2 ms as was used for A).

At 276, the matching engine 202 determines that the timer for data transaction request B has expired and performs match processing for data transaction request B.

At 278 (which may be concurrent to, for example, processing of the handling of data transaction request B by the distributed transaction processing system 200), the machine learning system 102 performs the inference processing to determine a new dynamic timer calculation of 1.75 ms at 278. However, because the volatility protection is still engaged, the calculated dynamic timer value is not communicated at this time. Note this situation is also illustrated in FIG. 7B.

At 280, the stability protection system 600 determines that the NBBO for ABCXYZ is no longer volatile. This determination may start a hold off period of 1 second (or other time period such as 500 ms or 750 ms), after which, at 282, the previously calculated dynamic timer value of 1.75 ms is communicated to the distributed transaction processing system 200. This causes (not shown) the duration value for ABCXYZ (in timers 218) to be updated to 1.75 ms.

At 284, a third data transaction request C is received and processed by the distributed transaction processing system 200 and matching engine 202.

At 286, the timer for C is started and set to 1.75 ms.

At 288, after 1.75 ms, the matching engine 202 determines that the timer for C has expired and performs match processing for C.

It will be appreciated that other sequences of actions are possible based on the described embodiments. For example, if order B arrived just before the reception of the timer value at 282 (for 1.75 ms), then its duration may be set to 12 ms. But if order C arrived just after 282, then its timer may be set to 1.75 ms. As discussed herein, this may cause a situation in which C's timer expires before B's. To address this issue, upon reception of a new timer value that is less than an immediately prior timer value, the matching engine may re calculate the expiration of timers that are using the prior duration. Thus, for example, if 10 ms has expired on B, then the matching engine 202 may reset the expiration of B's timer to be 1.75 ms (e.g., to retroactively apply the new timer duration to the existing timers) into the future upon reception of the new timer value at 1.75. As another example, if B has a timer duration of 2 ms, and an update message arrives to decrease the timer parameter by 0.5 ms, then the duration of the already triggered timer for B will be set to 1.5 ms. Thus, for example, if 1 ms has elapsed for B, then its timer will be retroactively adjusted and only 0.5 ms will be remaining on the timer for B. In some examples, such retroactive adjustments will only occur for decreases in timer durations. In other examples, all timer values may be adjusted regardless of whether the duration has increased or decreased. Of course, as discussed herein, other possible options for addressing this issue are also provided.

Details regarding how the operations shown in FIG. 2B (i.e., operations 248 through 288) may be performed in some embodiments may be found in other places throughout this document. For example, when it is described that the timer system 100 at operation 250 and operation 278 performs dynamic timer calculations, in some embodiments those calculations may be performed as described in connection with inter alia FIG. 1B; when it is described that a new data transaction request message is received at 256, communication of that message may be performed in some embodiments as described in connection with inter alia FIG. 2A; operations (including but not limited to performance of the match process) performed by the matching engine as described at operation 260 and operation 276 may be performed in some embodiments as described in connection with inter alia FIG. 2A; the stability protection system 600 performing operation 266 (for determining whether the volatility threshold has been exceeded) may be performed as described in connection with inter alia FIG. 6-FIG. 7B; and so on.

Description of FIG. 8

FIG. 8 is a block diagram of an example computing device 800 (which may also be referred to, for example, as a "computing device," "computer system," or "computing system") according to some embodiments. In some embodiments, the computing device 800 includes one or more of the following: one or more processors 802 (which may be referred to as "hardware processors" or individually as a "hardware processor"); one or more memory devices 804; one or more network interface devices 806; one or more display interfaces 808; and one or more user input adapters 810. Additionally, in some embodiments, the computing device 800 is connected to or includes a display device 812. As will explained below, these elements (e.g., the processors 802, memory devices 804, network interface devices 806, display interfaces 808, user input adapters 810, display device 812) are hardware devices (for example, electronic circuits or combinations of circuits) that are configured to perform various different functions for the computing device 800. In some embodiments, these components of the computing device 800 may be collectively referred to as computing resources (e.g., resources that are used to carry out execution of instructions and include the processors (one or more processors 802), storage (one or more memory devices 804), and I/O (network interface devices 806, one or more display interfaces 808, and one or more user input adapters 810). In some instances, the term processing resources may be used interchangeably with the term computing resources. In some embodiments, multiple instances of computing device 800 may arranged into a distributed computing system.

In some embodiments, each or any of the processors 802 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 802 uses an instruction set architecture such as x86 or Advanced RISC Machine (ARM).

In some embodiments, each or any of the memory devices 804 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 802). Memory devices 804 are examples of non-transitory computer-readable storage media.

In some embodiments, each or any of the network interface devices 806 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 806 may include ports or other connections that enable such connections to be made and communicate data electronically among the various components of a distributed computing system.

In some embodiments, each or any of the display interfaces 808 is or includes one or more circuits that receive data from the processors 802, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 812, which displays the image data. Alternatively, or additionally, in some embodiments, each or any of the display interfaces 808 is or includes, for example, a video card, video adapter, or graphics processing unit (GPU).

In some embodiments, each or any of the user input adapters 810 is or includes one or more circuits that receive and process user input data from one or more user input devices (not shown in FIG. 8) that are included in, attached to, or otherwise in communication with the computing device 800, and that output data based on the received input data to the processors 802. Alternatively, or additionally, in some embodiments each or any of the user input adapters 810 is or includes, for example, a PS/2 interface, a USB interface, a touchscreen controller, or the like; and/or the user input adapters 810 facilitates input from user input devices (not shown in FIG. 8) such as, for example, a keyboard, mouse, trackpad, touchscreen, etc.

In some embodiments, the display device 812 may be a Liquid Crystal Display (LCD) display, Light Emitting Diode (LED) display, or other type of display device. In embodiments where the display device 812 is a component of the computing device 800 (e.g., the computing device and the display device are included in a unified housing), the display device 812 may be a touchscreen display or non-touchscreen display. In embodiments where the display device 812 is connected to the computing device 800 (e.g., is external to the computing device 800 and communicates with the computing device 800 via a wire and/or via wireless communication technology), the display device 812 is, for example, an external monitor, projector, television, display screen, etc.

In various embodiments, the computing device 800 includes one, or two, or three, four, or more of each or any of the above-mentioned elements (e.g., the processors 802, memory devices 804, network interface devices 806, display interfaces 808, and user input adapters 810). Alternatively, or additionally, in some embodiments, the computing device 800 includes one or more of: a processing system that includes the processors 802; a memory or storage system that includes the memory devices 804; and a network interface system that includes the network interface devices 806. Alternatively, or additionally, in some embodiments, the computing device 800 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 802 and the network interface devices 806; or the single SoC (or the multiple SoCs) may include the processors 802, the network interface devices 806, and the memory devices 804; and so on. The computing device 800 may be arranged in some embodiments such that: the processors 802 include a multi or single-core processor; the network interface devices 806 include a first network interface device (which implements, for example, WiFi, Bluetooth, NFC, etc.) and a second network interface device that implements one or more cellular communication technologies (e.g., 3G, 4G LTE, CDMA, etc.); the memory devices 804 include RAM, flash memory, or a hard disk. As another example, the computing device 800 may be arranged such that: the processors 802 include two, three, four, five, or more multi-core processors; the network interface devices 806 include a first network interface device that implements Ethernet and a second network interface device that implements WiFi and/or Bluetooth; and the memory devices 804 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the timer system 100, machine learning system 102, stability protection system 600, distributed transaction processing system 200, matching engine 202, processing instance(s) 220, reinforcement learning system 20, generate training data module 304, model training module 302, simulation system 500, and all subsidiary systems thereof, each of which will be referred to individually for clarity as a "component" for the remainder of this paragraph, are implemented using an example of the computing device 800 of FIG. 8. In such embodiments, the following applies for each component: (a) the elements of the 800 computing device 800 shown in FIG. 8 (i.e., the one or more processors 802, one or more memory devices 804, one or more network interface devices 806, one or more display interfaces 808, and one or more user input adapters 810), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 804 (e.g., in various embodiments, in a volatile memory device such as a RAM or an instruction register and/or in a non-volatile memory device such as a flash memory or hard disk) and all actions described herein as performed by the software modules are performed by the processors 802 in conjunction with, as appropriate, the other elements in and/or connected to the computing device 800 (i.e., the network interface devices 806, display interfaces 808, user input adapters 810, and/or display device 812); (c) alternatively or additionally, to the extent it is described herein that the component processes and/or otherwise handles data, in some embodiments, such data is stored in the memory devices 804 (e.g., in some embodiments, in a volatile memory device such as a RAM and/or in a non-volatile memory device such as a flash memory or hard disk) and/or is processed/handled by the processors 802 in conjunction, as appropriate, the other elements in and/or connected to the computing device 800 (i.e., the network interface devices 806, display interfaces 808, user input adapters 810, and/or display device 812); (d) alternatively or additionally, in some embodiments, the memory devices 802 store instructions that, when executed by the processors 802, cause the processors 802 to perform, in conjunction with, as appropriate, the other elements in and/or connected to the computing device 800 (i.e., the memory devices 804, network interface devices 806, display interfaces 808, user input adapters 810, and/or display device 812), each or any combination of actions described herein as performed by the component and/or by any software modules described herein as included within the component.

Consistent with the preceding paragraph, as one example, in an embodiment where an instance of the computing device 800 is used to implement the timer system 100 or machine learning system 102, the memory devices 804 could load and/or store the data for trained model 110, the data for selected features 116 and the instructions associated with the data preparation module 118. As data 140 is received by the computing device, the data may be loaded into memory devices 804 and the processing of the data preparation module 118 performed thereon. The resulting output of that processing may be stored in new memory locations of memory devices 804 (which may be on the same or another computing device 800). The instructions for the inference agent process may then be loaded into memory devices and the inference process executed in accordance with those instructions to produce an output signal from the loaded trained model 110.

The hardware configurations shown in FIG. 8 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 8, (e) via other hardware arrangements, architectures, and configurations, and/or via combinations of the technology described in (a) through (e).

Technical Advantages of Described Subject Matter

Electronic systems can be configured with values that control components or processes of such systems. Such values can be used to, for example, control the length or duration of a timer. These values are typically statically defined and initially set based on domain knowledge from experts, trial-and-error approaches, etc. A problem with this approach is that statically defined values (such as those used for timers) can lead to inefficiencies in the operation of a system. For example, a statically defined value may be based on certain retrospective knowledge or other information that is available to the domain expert when the value is set during downtime of the system. However, the circumstances of operation of the system may change while the system is operating. Thus, the statically defined timer value being used by the system may not represent an efficient use of system resources or the like—i.e., as of the present state of the system. In other words, a problem with using statically defined values is that they do not change during operation of the system (e.g., during an operational period for the system) in a manner that considers the current performance of the system (or components thereof). Such issues can be problematic in transaction processing systems that rely on timers to process certain types of data transaction requests. Accordingly, in some embodiments, a solution for overcoming the use of statically defined timers and the negative efficiencies that result from such implementation is in the use of dynamically controlled timers used in transaction processing systems (such as distributed transaction processing system 20). The dynamic control is provided by adjusting or updating the duration by which a timer is active. In some instances, this adjustment or updating may occur hundreds of times over an operational period of the transaction processing system. This also allows for different instances of a timer to provide different durations (e.g., over an operational period) by which newly received data transaction requests are held before being processed by the transaction processing system. In such implementations (i.e., that dynamically adjusts the duration for how long timers are active), a transaction processing system is allowed to better react to changing conditions and improve the efficiency and/or quality by which data transaction requests are processed. In this type of implementation, the negative effects related to changes in communication latency, changes in how much or how quickly other tracked values change, may be at least partly alleviated by dynamically controlling the duration that a timer operates for. For example, a first data transaction request may have a timer with a first duration and a second data transaction may have a timer with a second duration. The duration of these timers may be dynamically controlled to account for latency considerations and/or how quickly the state of a monitored environment (e.g., the system performing the transaction processing) is changing. This type of implementation can therefore improve the overall efficiency (e.g., in comparison to static or non-dynamic timer implementations) by which the transaction processing system operates.

Some reasons that static timers are often used are that they require fewer programming resources and fewer real-time (e.g., computing) resources to implement than those required by dynamic timers. They require fewer programming resources because the timer value can be set upon initialization of the system and there is no need to further consider how to update that value during operation of the system. Static timers also require fewer real-time computing resources as there is no need to determine (e.g., calculate) how the value should be adjusted during operation. Accordingly, when dynamic timers are considered, there are at least two important technical problems to be addressed. The first technical problem is determining how the value for the timer should be adjusted (or more generally what the value for timer used by the system should be). The second technical problem relates to how to engineer a system that will be able to efficiently deliver that determined value to the transaction process system for use. This second problem can be more pronounced in high performance transaction processing systems as it is desirable to avoid impacting performance of the transaction processing system with additional tasks (such as calculating how to adjust a timer value). The architecture proposed in the instant application addresses both of these technical problems.

In certain examples, the proposed architecture provides a technical solution for the problem of determining how the value for the timer should be adjusted through the use of a trained model (e.g., a trained neural network) to provide the updates to the system. In other words, a technical advantage with the proposed architecture is provided by using a trained neural network to provide dynamic updates to the duration by which a timer used by a transaction processing system should be adjusted. The trained neural network provides insight into how hundreds of different features interact with one another. The trained neural network (e.g., which has been trained on potentially over 100 features) allows for relatively quick (e.g., less than 1 minute) updates to the timer that may be otherwise be infeasible considering the type and amount of data being processed in connection with each update. The scope of the data that is being analyzed in the given amount of time (e.g., every 30 seconds) is made possible by the use of the trained neural network.

In certain examples, the proposed architecture provides a technical solution that allows for operation of the transaction processing system to be relatively unaffected by determining how/when to change a timer value. This technical solution is accomplished by having an external computing system (e.g., the timer system 100) process data stream(s) (e.g., 130) that are communicated from the transaction processing system (or other systems as needed) in order to determine how the timer value should be adjusted. The data stream includes information that represents state changes within the state of the transaction processing system. For example, when a data transaction request is canceled, added, matched, or the like. All of these represent state changes within the transaction processing system. When a machine learned model is used in the calculation process, this distribution of processing (e.g., between systems 100 and 200) can be important due to the amount of data (e.g., the feature values) being processed each time machine learning inference is performed. The output of that processing can then be communicated to the transaction processing system that may then update the dynamic timer value. This distribution advantageously allows processing performed within the distributed transaction processing system 200 (e.g., at the matching engine 202) to execute at the same or similar speed to architectures in which a static timer is used. In other words, some of the drawbacks of using dynamic timers can be alleviated with the proposed architecture as it balances being able to react to changes within the transaction processing system while also being able to determine how the timer(s) should be adjusted.

A problem with machine learning or executing trained models to provide updates is that the computing resources required to train the model and to generate the timer updates can be substantial. A technical solution to this problem is provided by using the same trained model in connection with generating timer values for the control of different timers used within the system. In other words, another technical advantage is that multiple instances of machine learning inference may be performed with the same trained neural network for feature values calculated for multiple different symbols. Each of the symbols may have unique feature values associated with that symbol that are used in connection with each instance of machine learning inference that is performed for a corresponding symbol. This approach allows reuse of the same trained neural network in connection with the same features, but different feature values, to produce different signals that are output as a result of the machine learning inference. Accordingly, timers for different symbols may be dynamically updated differently (e.g., including independently and/or uniquely) depending on the data that makes up the feature values for each respective symbol.

Using machine learning and models (e.g., neural networks) trained using machine learning provides probabilistic output that is influenced based on how the model was trained. A problem with this approach is that the training of a model may not properly account for every situation. In such instances, a trained model may provide output that is not "correct" or not desired for the operation of the transaction processing system that is using the timer. A solution to this problem is provided by a stability protection system that allows for detecting periods of volatility and having a default timer value supersede dynamically changed timer values. Such a protection system allows detecting abnormal periods (e.g., edge cases) that the machine learning inference processing may not appropriately account for. Accordingly, the proposed architecture may combine the use of machine learning inference with a stability process that is configured to account for periods that may not be appropriately accounted for by the inference processing. Advantageously, this protection system may operate both in parallel/concurrently with the determination of dynamic timer values and/or at a frequency that is greater than the rate at which dynamic timer values are determined.

In certain examples, the problem of detecting/determining what is a period of volatility/instability is provided in a technical solution that determines such periods using a threshold that is based on historical data (e.g., a prior day, prior week, etc.). This approach allows for such volatility to be detected with respect to the unique characteristics of each symbol rather than a generic determination. In some examples, the threshold is based on assessing some percentage (e.g., 1%, 2%, etc.) of a prior period as unstable.

Another problem with training neural networks relates to inefficiencies in training and/or the amount of time that training can take. Multiple improvements to the training process are discussed herein and they each provide a solution to the problem of training a neural network using machine learning.

A solution that provides for decreased training time is realized by the technical advantage of the described systems that involves training the neural network by concurrently writing (e.g., in parallel as opposed to sequentially) state and other data to a buffer. This data may then be sampled or otherwise read as part of the process that is used to train the neural network. This technical advantage can improve the speed by which the training process takes place and can be of increasing importance as the number of features increases in quantity.

Another solution that provides for decreased training time is realized by the technical advantage that the data written to a buffer used for training may only include those tuples with non-zero reward calculations. This approach can improve the overall efficiency of the training process as episodes with reward values of 0 are ignored/dropped. This can improve the relevancy of the data on which the neural network is being trained and accordingly improve the efficiency of training (e.g., as tuples with 0 reward may be ignored).

A further solution that improves the training process is realized with the technical advantage provided by using multiple buffers for each component of the reward function that is used as part of the reinforcement learning process. This approach allows for a more balanced approach to training when the reward function includes multiple components. Accordingly, the resulting neural network that is trained may be better or more efficiently trained than otherwise.

Yet another solution that improves the training process is realized with the technical advantage of capping the number of sampling iterations performed on a given buffer at the number of symbols for which episodes have been generated. This approach can improve the efficiency of training the resulting neural network.

A further technical solution that improves the training process includes the use of two different neural networks. The first neural network is updated more frequently than the second neural network. This technique allows the weights of the first neural network to be updated more frequently (e.g., as a result of each iteration of training) while having the weights of the second neural network updated after multiple training iterations. This technique improves the quality of the resulting neural network that is trained.

A problem with high-performance computing systems, such as the distributed transaction processing system described herein, is that the components of the system may process millions or billions of transactions per day. Due in part to such intense performance requirements, additional processing added to the system (such as the ability to track, update, and process dynamic timers as described herein) can have a detrimental effect on the overall system performance. A solution to this problem is realized with the technical advantage provided by the proposed architecture of using processing instances that are distributed across the system. Processing instances may receive new sequenced message that contain a timestamp provided by a sequencer and use those messages to determine if any timers that are being tracked by that processing instance have expired. This type of implementation may advantageously allow for timers to be synchronized, controlled by, or based on the processing performed by a sequencer—and the ordering of message processing that it provides. This allows for a centralized timer to be maintained, without also having the sequencer 212 (or the matching engine) be responsible for determining when a timer for a given data transaction request has expired.

Machine learning inference can be a resource intensive task—especially in cases with many features and/or the inference is performed frequently (such as the implementations described herein). When determining how a timer should be adjusted, a theoretical optimal approach may be to determine such adjustments after every action taken by a transaction processing system. However, this type of approach may infeasible when the transaction processing system operates on a nanosecond basis (e.g., the latency between when requests are handled by the transaction processing system) with millions or billions or requests per day. With such practical constraints, the amount of time it takes for each inference to be performed may exceed the latency requirements of the transaction processing system. A solution to such practical constraints is realized in the use of a buffer that is populated with features values based on messages received from the transaction processing system. The feature values in the buffer may then be retrieved on a periodic basis for performing machine learning inference. In certain implementations, the periodic basis for performing machine learning inference may be between about 15 and 30 seconds. This update cadence was determined to provide an appropriate balance between the ability to update the timer to achieve the goals discussed herein, while also operating within the practical networking and computational resource constraints. With this type of implementation, the periods between machine learning inference can be used to continually update or calculate the feature values for the buffer as new messages are received regarding processing performed by the transaction processing system. Accordingly, in order to make efficient use of computational resources during the interference process a buffer can be used to gather data (e.g., on a continuous basis) for the feature values used for the machine learning inference.

Additional technical advantages embodied in the subject matter of this specification beyond those outlined above may be apparent to the skilled person.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although some examples are provided herein with respect to the trading of equities (i.e., equity securities/stock), the technology described herein may also be used, mutatis mutandis, with any type of asset, including but not limited to other types of financial instruments (e.g., bonds, options, futures), currencies, digital assets (including but not limited to cryptocurrencies), and/or non-financial assets. Further, although examples are provided herein with respect to electronic trading platforms, the technology described herein may also be used, mutatis mutandis, with other types of distributed computing systems, including but not limited to telecommunication networks, payment processing systems, industrial control systems, parallel scientific computation systems, smart contract systems, transaction processing systems, distributed databases, and/or other types of distributed systems.

Although process steps, algorithms or the like, including without limitation with reference to FIGS. 1A-8, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
   memory configured to store a plurality of timer parameters, with each timer parameter being associated with a different one of a plurality of identifiers, wherein values for the plurality of timer parameters are variable between different ones of the plurality of identifiers and values for the plurality of timer parameters are dynamically adjustable over an operational period;
   a processing system comprising instructions that, when executed by at least one hardware processor included with the processing system, cause the at least one hardware processor to perform operations comprising:
      executing a matching process to match different data transaction requests;
      setting the timer parameter that is associated with a first identifier of the plurality of identifiers to a first value;
      receiving a first data transaction request that is for the first identifier;
      activating a first timer for the first data transaction request, wherein a duration for the first timer for the first data transaction request is at least initially set based the first value, wherein, while the first timer has yet to expire, the first data transaction request is not included in processing that is performed by the matching process;
      based on a timer message for the first identifier, updating the timer parameter associated with the first identifier from the first value to a second value that is different than the first value;
      receiving a second data transaction request that is for the first identifier; and
      activating a second timer for the second data transaction request, wherein a duration of time for the second timer for the second data transaction request is at least initially set to the second value, wherein, while the second timer has yet to expire, the second data transaction request is not included in processing that is performed by the matching process.

2. The computer system of claim 1, wherein the operations further comprise:
   communicating, to another computer system that stores a trained neural network, data messages that are at least based on data processing that has been performed by the matching process; and
   receiving, based on the data messages communicated to the other computer system, the timer message, wherein the timer message is based on machine learning inference that generated an output signal from the trained neural network indicating a relative change for a value for the timer parameter.

3. The computer system of claim 2, wherein the operations further comprise:
   receiving a second timer message that is based on a stability metric exceeding a defined threshold; and
   updating the timer parameter to a third value based on the second timer message, wherein the third value is greater than the first value or the second value.

4. The computer system of claim 2, wherein the operations further comprise:
   communicating, to the other computer system that stores a trained neural network, data messages that are at least based on data processing that has been performed by the matching process based on use of the first timer for the first data transaction request or use of the second timer for the second data transaction request.

5. The computer system of claim 1, wherein the operations further comprise:
   based on activation of the first timer, storing, to a first-in-first-out (FIFO) data structure, the first data transaction request; and
   based on activation of the second timer, which is activated after the first timer, storing, to the FIFO data structure, the second data transaction request, wherein the first data transaction request is already included in the FIFO data structure when the second data transaction request is added to the FIFO data structure.

6. The computer system of claim 5, wherein when the second timer expires before the first timer expires, the second data transaction request is only removed from the FIFO data structure after the first data transaction request, wherein the matching process for the second data transaction request is executed after execution of the matching process for the first data transaction request.

7. The computer system of claim 1, wherein the operations further comprise:
   determining that the first data transaction request satisfies at least one condition, wherein activation of the first timer for the first data transaction request is additionally based on determination that the first data transaction request has satisfied the at least one condition.

8. The computer system of claim 1, wherein the operations further comprise:
receiving timer update messages for each one of the plurality of identifiers; and
for each corresponding one of the timer update messages, updating the timer parameter for a corresponding identifier of the plurality of identifiers.

9. The computer system of claim 8, wherein the timer parameter for each one of the plurality of identifiers is updated at least 100 times over the operational period for the computer system.

10. The computer system of claim 9, wherein the plurality of identifies is at least 100 different identifiers, each with an associated timer parameter.

11. The computer system of claim 1, wherein a sequence of updates to the timer parameter for any individual one of the plurality of identifiers is unique over the operational period for the computer system.

12. The computer system of claim 1, wherein the first data transaction request is matched to the second data transaction request based on execution of the matching process after expiration of both the first timer and the second timer.

13. The computer system of claim 1, wherein the first data transaction request is associated with a first identifier and the second data transaction request is associated with second identifier, wherein the matching process only matches data transaction requests with the same identifier.

14. The computer system of claim 1, wherein the memory is further configured to store a trained neural network;
wherein the operations further comprise:
generating a plurality of feature values, wherein the generated plurality of feature values is an environment state that is a vector with size equal to an n-dimensional feature space, with n being the number of features; and
using the generated plurality of feature values to perform machine learning inference to obtain an output signal from the trained neural network that indicates a relative change that is used to determine a new timer value,
wherein the timer update message is based on the indicated relative change and includes the new timer value.

15. The computer system of claim 14, wherein the machine learning inference is performed for a plurality of identifiers based on differently calculated feature values, wherein the same trained neural network is used for the machine learning inference for the differently calculated feature values to thereby obtain different indications for different changes of different timer values for the plurality of identifiers.

16. The computer system of claim 1, wherein the at least one hardware processor includes a first hardware processor and a second hardware processor, wherein executing the matching process is performed by the first hardware processor and activating the first timer and the second timer is performed by the second hardware processor.

17. The computer system of claim 1, wherein the operations further comprise:
as part of activating the first timer, calculating, based on the timer parameter for the first identifier, an expiration time and storing the expiration time in connection with the first data transaction request;

obtaining a current time value that is based on a real-time clock of the computer system;
comparing the current time value to the stored expiration time that is associated with the first data transaction request; and
based on determination that the current time value is greater than or equal to the stored expiration time, determining that the first timer has expired.

18. The computer system of claim 17, wherein when the timer message for the first identifier includes data indicating a decrease for the timer parameter, the operations further comprise:
calculating a new expiration time for the first data transaction request that is based on a resulting decrease in the timer parameter; and
updating, prior to expiration of the first timer, the expiration time that is stored for the first data transaction request to be the new expiration time.

19. The computer system of claim 1, wherein when the timer message for the first identifier includes data indicating a decrease for the timer parameter, the operations further comprise:
based on the timer message for the first identifier, updating the first timer to expire in accordance with the second value, wherein the first timer for the first data transaction request expires prior to expiration of the second timer for the second data transaction request.

20. A method of timer control in a transaction processing system, the method comprising:
storing a plurality of timer parameters, with each timer parameter being associated with a different one of a plurality of identifiers, wherein values for the plurality of timer parameters are variable between different ones of the plurality of identifiers and values for the plurality of timer parameters are dynamically adjustable over an operational period;
executing a matching process to match different data transaction requests;
setting the timer parameter that is associated with a first identifier of the plurality of identifiers to a first value;
receiving a first data transaction request that is for the first identifier;
activating a first timer for the first data transaction request, wherein a duration for the first timer for the first data transaction request is at least initially set to the first value, wherein, while the first timer has yet to expire, the first data transaction request is not included in processing that is performed by the matching process;
based on a timer message for the first identifier, updating the timer parameter associated with the first identifier from the first value to a second value that is different than the first value;
receiving a second data transaction request that is for the first identifier; and
activating a second timer for the second data transaction request, wherein a duration of time for the second timer for the second data transaction request is at least initially set to the second value, wherein, while the second timer has yet to expire, the second data transaction request is not included in processing that is performed by the matching process.

21. The method of claim 20, further comprising:
communicating, to another computer system that stores a trained neural network, data messages that are at least based on data processing that has been performed by the matching process; and receiving, based on the data messages communicated to the other computer system, the timer message from the other computer system, wherein the timer message is based on machine learning inference that generated an output signal from the trained neural network indicating a relative change for a value for the timer parameter.

22. A non-transitory computer readable storage medium storing instructions for use with a distributed computing system, the distributed computing system including a plurality of computing devices that communicate by using an electronic data network, each of the plurality of computing devices including at least one hardware processor, the stored instructions comprising instructions that are configured to cause at least one hardware processor to perform operations comprising:

storing a plurality of timer parameters, with each timer parameter being associated with a different one of a plurality of identifiers, wherein values for the plurality of timer parameters are variable between different ones of the plurality of identifiers and values for the plurality of timer parameters are dynamically adjustable over an operational period;

executing a matching process to match different data transaction requests;

setting the timer parameter that is associated with a first identifier of the plurality of identifiers to a first value;

receiving a first data transaction request that is for the first identifier;

activating a first timer for the first data transaction request, wherein a duration for the first timer for the first data transaction request is at least initially set to the first value, wherein, while the first timer has yet to expire, the first data transaction request is not included in processing that is performed by the matching process;

based on a timer message for the first identifier, updating the timer parameter associated with the first identifier from the first value to a second value that is different than the first value;

receiving a second data transaction request that is for the first identifier; and activating a second timer for the second data transaction request, wherein a duration of time for the second timer for the second data transaction request is at least initially set to the second value, wherein, while the second timer has yet to expire, the second data transaction request is not included in processing that is performed by the matching process.

23. The non-transitory computer readable storage medium of claim 22, wherein the operations further comprise:

communicating, to another computer system that stores a trained neural network, data messages that are at least based on data processing that has been performed by the matching process; and receiving, based on the data messages communicated to the other computer system, the timer message from the other computer system, wherein the timer message is based on machine learning inference that generated an output signal from the trained neural network indicating a relative change for a value for the timer parameter.

* * * * *